US012562969B2

(12) United States Patent
Bachu et al.

(10) Patent No.: US 12,562,969 B2
(45) Date of Patent: Feb. 24, 2026

(54) COMBINING SCHEMES FOR SHARED OPEN RADIO ACCESS NETWORKS

(71) Applicant: QUALCOMM Incorporated, San Diego, CA (US)

(72) Inventors: Raja Sekhar Bachu, Kendall Park, NJ (US); Chaitanya Kumar Matcha, Hyderabad (IN); Saurabh Shandilya, New Delhi (IN)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 18/256,624

(22) PCT Filed: Dec. 16, 2021

(86) PCT No.: PCT/US2021/063884
§ 371 (c)(1),
(2) Date: Jun. 8, 2023

(87) PCT Pub. No.: WO2022/173506
PCT Pub. Date: Aug. 18, 2022

(65) Prior Publication Data
US 2024/0097997 A1     Mar. 21, 2024

(30) Foreign Application Priority Data

Feb. 12, 2021     (IN) .............................. 202121006045

(51) Int. Cl.
*H04L 43/022*     (2022.01)
*H04B 17/336*     (2015.01)
*H04L 43/0852*     (2022.01)

(52) U.S. Cl.
CPC ......... *H04L 43/022* (2013.01); *H04B 17/336* (2015.01); *H04L 43/0852* (2013.01)

(58) Field of Classification Search
None
See application file for complete search history.

(56) References Cited

U.S. PATENT DOCUMENTS

| | | | |
|---|---|---|---|
| 2013/0064170 A1 | 3/2013 | Lee et al. | |
| 2015/0282105 A1 | 10/2015 | Harel | |
| 2018/0007562 A1* | 1/2018 | Auer | ..................... H04W 16/32 |

OTHER PUBLICATIONS

International Search Report and Written Opinion—PCT/US2021/063884—ISA/EPO—Apr. 14, 2022 (2101203WO).

* cited by examiner

*Primary Examiner* — Anh Ngoc M Nguyen
(74) *Attorney, Agent, or Firm* — Holland & Hart LLP/Qualcomm

(57) ABSTRACT

Methods, systems, and devices for wireless communications are described. A distributed unit (DU) component/function of a base station may determine, for one or more radio units associated with the distributed unit, one or more sampling metrics associated with signal combining operations at the radio units. The DU may select, based at least in part on the one or more sampling metrics, a combining scheme to use for the signal combining operations. The DU may provide an indication of the selected combining scheme to at least one radio unit of the one or more radio units.

27 Claims, 13 Drawing Sheets

510

520

515

505

500

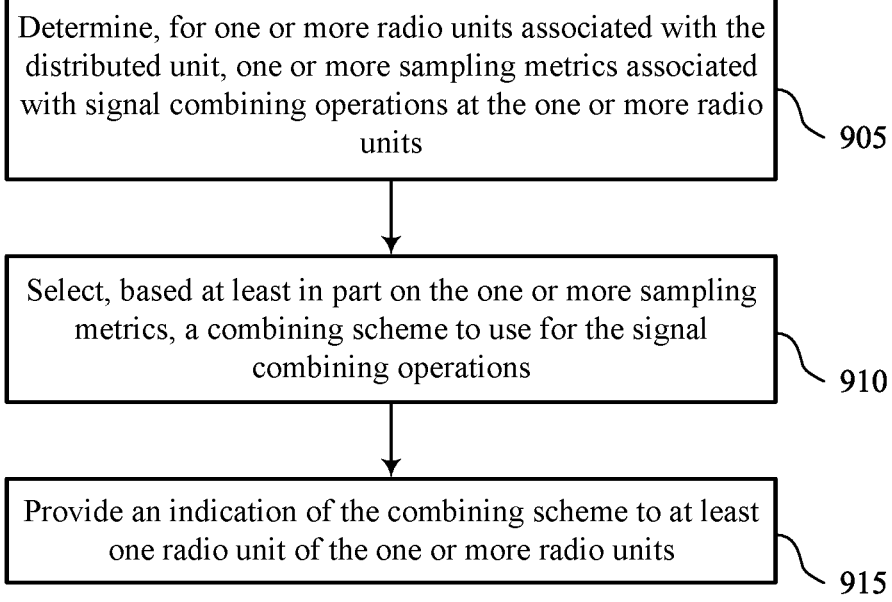

Determine, for one or more radio units associated with the distributed unit, one or more sampling metrics associated with signal combining operations at the one or more radio units ⎤ 905

Select, based at least in part on the one or more sampling metrics, a combining scheme to use for the signal combining operations ⎤ 910

Provide an indication of the combining scheme to at least one radio unit of the one or more radio units ⎤ 915

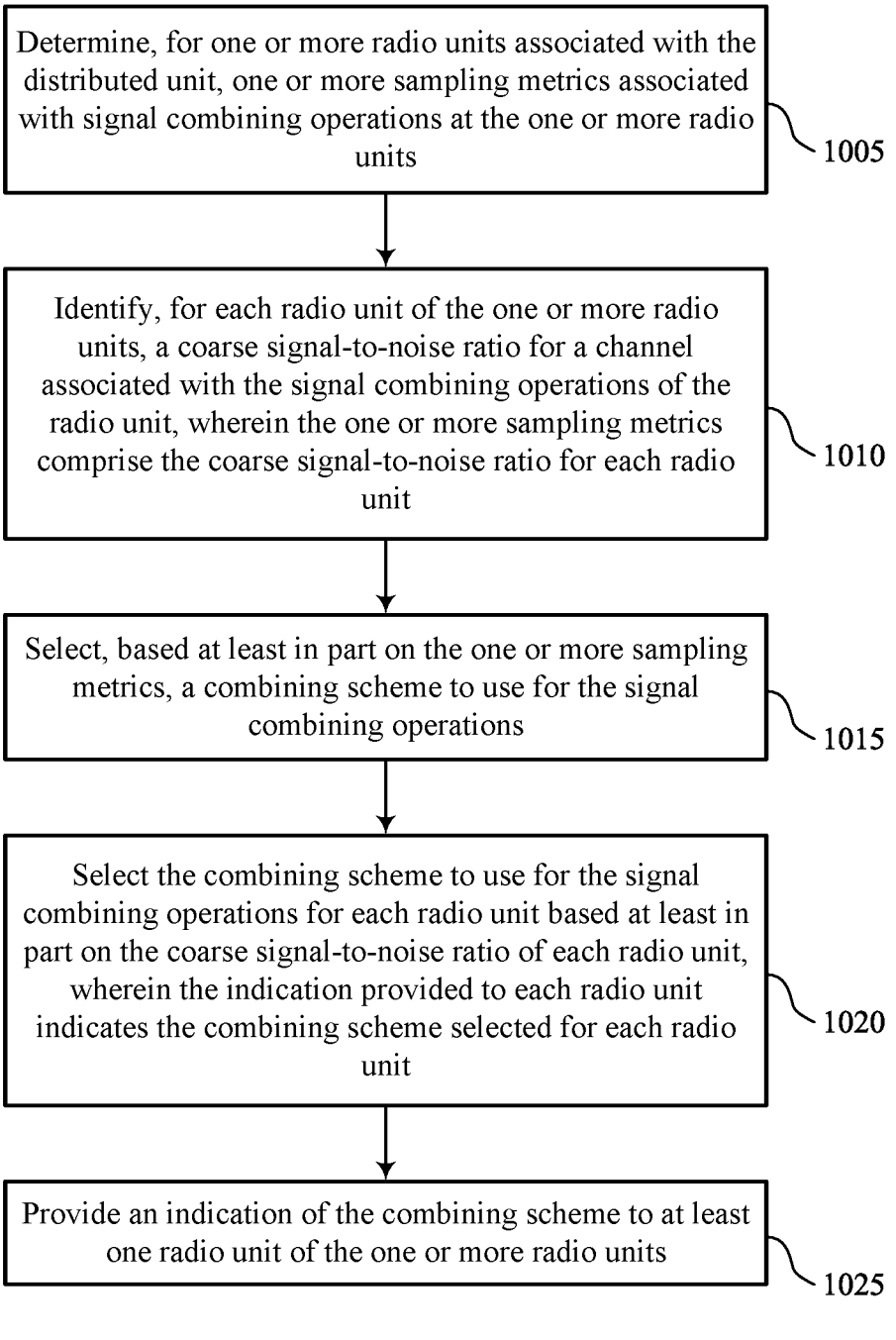

Determine, for one or more radio units associated with the distributed unit, one or more sampling metrics associated with signal combining operations at the one or more radio units ⟩ 1005

Identify, for each radio unit of the one or more radio units, a coarse signal-to-noise ratio for a channel associated with the signal combining operations of the radio unit, wherein the one or more sampling metrics comprise the coarse signal-to-noise ratio for each radio unit ⟩ 1010

Select, based at least in part on the one or more sampling metrics, a combining scheme to use for the signal combining operations ⟩ 1015

Select the combining scheme to use for the signal combining operations for each radio unit based at least in part on the coarse signal-to-noise ratio of each radio unit, wherein the indication provided to each radio unit indicates the combining scheme selected for each radio unit ⟩ 1020

Provide an indication of the combining scheme to at least one radio unit of the one or more radio units ⟩ 1025

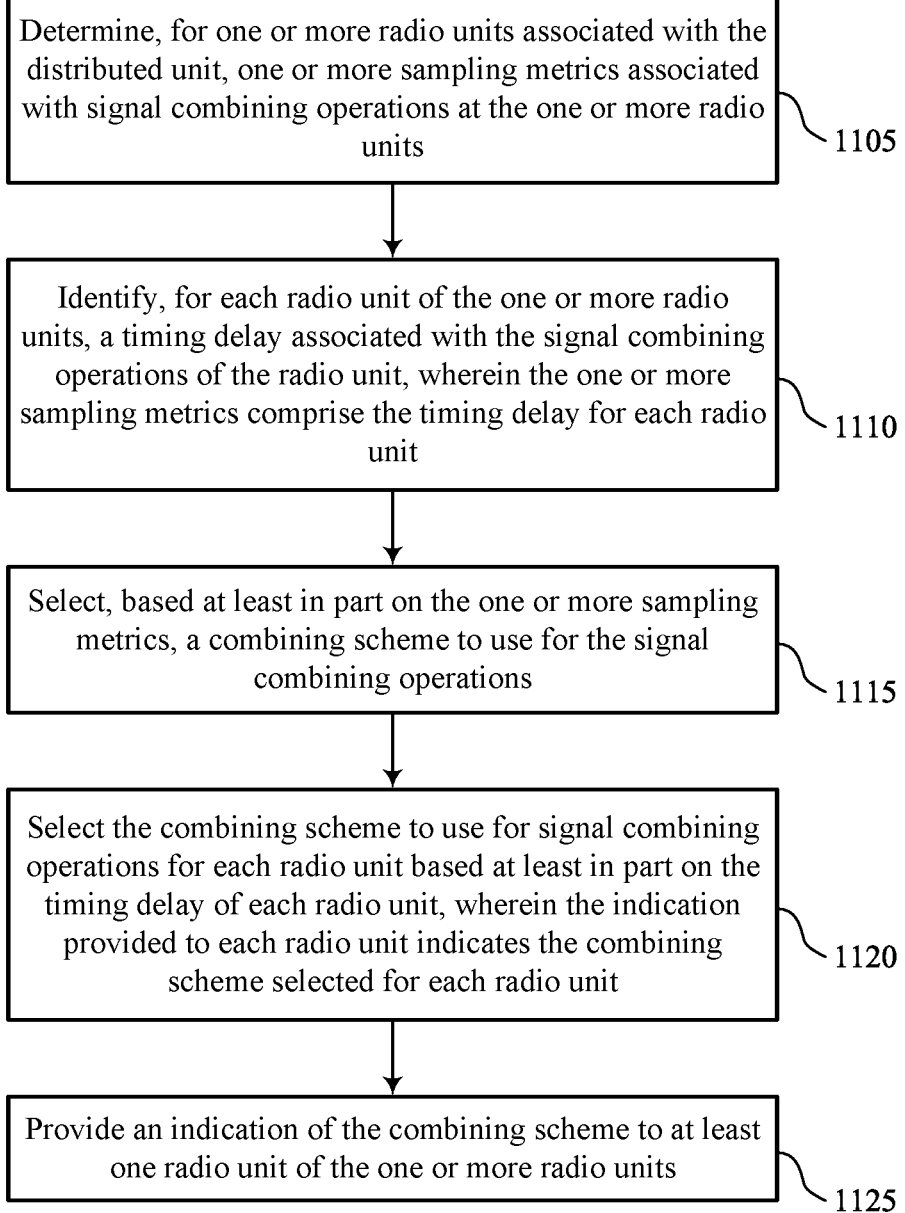

Determine, for one or more radio units associated with the distributed unit, one or more sampling metrics associated with signal combining operations at the one or more radio units ⟍ 1105

Identify, for each radio unit of the one or more radio units, a timing delay associated with the signal combining operations of the radio unit, wherein the one or more sampling metrics comprise the timing delay for each radio unit ⟍ 1110

Select, based at least in part on the one or more sampling metrics, a combining scheme to use for the signal combining operations ⟍ 1115

Select the combining scheme to use for signal combining operations for each radio unit based at least in part on the timing delay of each radio unit, wherein the indication provided to each radio unit indicates the combining scheme selected for each radio unit ⟍ 1120

Provide an indication of the combining scheme to at least one radio unit of the one or more radio units ⟍ 1125

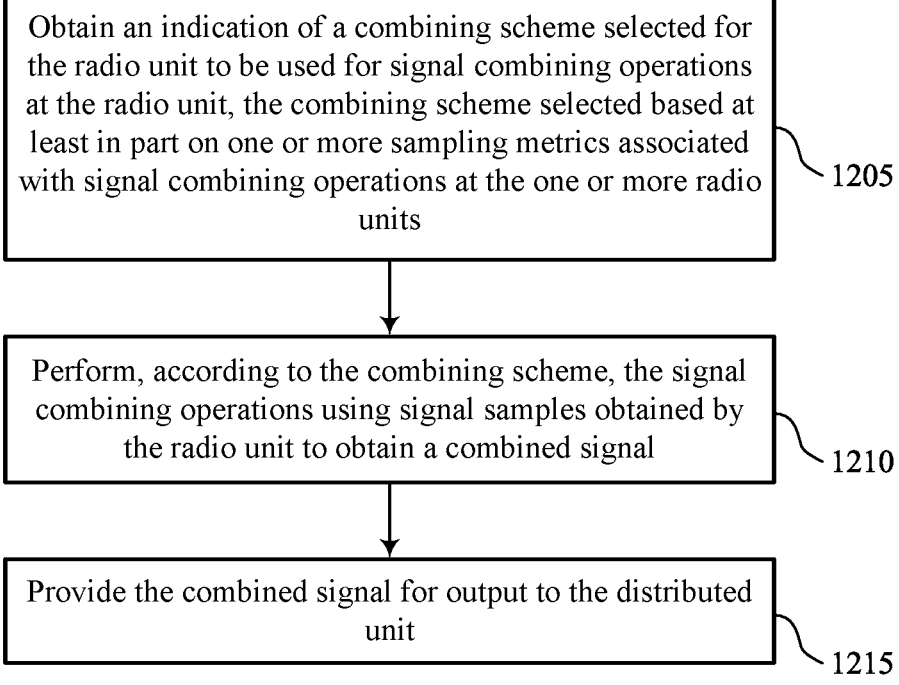

Obtain an indication of a combining scheme selected for the radio unit to be used for signal combining operations at the radio unit, the combining scheme selected based at least in part on one or more sampling metrics associated with signal combining operations at the one or more radio units

1205

Perform, according to the combining scheme, the signal combining operations using signal samples obtained by the radio unit to obtain a combined signal

1210

Provide the combined signal for output to the distributed unit

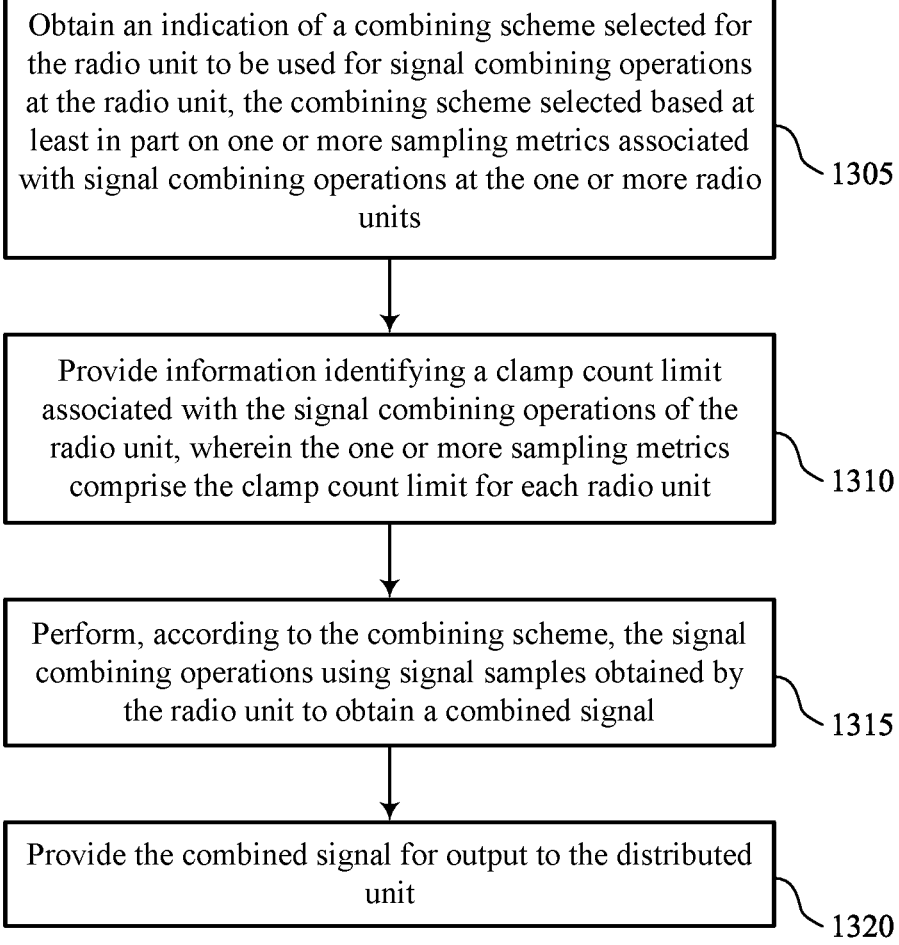

Obtain an indication of a combining scheme selected for the radio unit to be used for signal combining operations at the radio unit, the combining scheme selected based at least in part on one or more sampling metrics associated with signal combining operations at the one or more radio units —— 1305

Provide information identifying a clamp count limit associated with the signal combining operations of the radio unit, wherein the one or more sampling metrics comprise the clamp count limit for each radio unit —— 1310

Perform, according to the combining scheme, the signal combining operations using signal samples obtained by the radio unit to obtain a combined signal —— 1315

Provide the combined signal for output to the distributed unit —— 1320

COMBINING SCHEMES FOR SHARED OPEN RADIO ACCESS NETWORKS

CROSS REFERENCE

The present application is a 371 national stage filing of International PCT Application No. PCT/US2021/063884 by Bachu et al. entitled "COMBINING SCHEMES FOR SHARED OPEN RADIO ACCESS NETWORKS," filed Dec. 16, 2021; and claims priority to Indian Patent Application No. 202121006045 by Bachu et al., entitled "COMBINING SCHEMES FOR SHARED OPEN RADIO ACCESS NETWORKS," filed Feb. 12, 2021, each of which is assigned to the assignee hereof, and each of which is expressly incorporated by reference in its entirety herein.

FIELD OF TECHNOLOGY

The following relates to wireless communications, including combining schemes for shared open radio access networks.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support combining schemes for shared open radio access networks. Broadly, aspects of the described techniques support various mechanisms that improve wireless communications within a central unit (CU)/distributed unit (DU) split configuration within a base station in an open radio access network (O-RAN) architecture. The CU/DU split may include a CU function performed at or by the base station, with the CU managing aspects of communications for one or more DU functions. Each DU function may manage one or more radio unit(s) (RU)(s) (e.g., radio heads) performing wireless communications with user equipment (UE). A DU function of the base station may determine various "sampling metrics" for the RUs it manages or is otherwise associated with. The sampling metrics may correspond to a coarse signal-to-noise ratio (SNR), a timing delay (e.g., a timing delay relative to each RU), a clamping count limit, etc., for each RU. The DU may measure aspects of the sampling metric directly, may obtain the sampling metric from a fronthaul multiplexer (FHM) associated with the DU, and/or may obtain the sampling metric from each respective RU. The DU may then use the sampling metric to select the combining scheme to be used by each RU to account for excessive noise, timing delays, etc. For example, RUs connected in a cascaded mode may combine the signal samples they received over-the-air with signal samples received from downstream RU(s). The combined signal samples may then be passed upstream to be combined with the signal samples of upstream RU(s) or passed to the DU if there are no upstream RU(s). For example, the clamping count exceeding a threshold (e.g., combined signal sample power>THRESHOLD) may signal that at least one RU is too close to the transmitting UE, and therefore the DU may scale down the over-the-air signals for RU(s) being saturated to avoid interference in the combining operations. The DU may provide an indication of the selected combining scheme to each RU, which uses the combing scheme for combining operations. The combining scheme selected for each RU may be updated to account for changing conditions regarding the sampling metric. Accordingly, the described techniques address non-optimal combining schemes according to some configurations. Moreover, configuring the DU/RU in a cascaded manner permits the RU(s) to combine signal samples at each RU level, therefore reducing the processing load of the DU (e.g., spreading the combining operations processing at the RU(s)).

A method for wireless communication at a DU associated with a base station is described. The method may include determining, for one or more RUs associated with the DU, one or more sampling metrics associated with signal combining operations at the one or more RUs, selecting, based on the one or more sampling metrics, a combining scheme to use for the signal combining operations, and providing an indication of the combining scheme to at least one RU of the one or more RUs.

An apparatus for wireless communication at a DU associated with a base station is described. The apparatus may include a processor, memory coupled with the processor, and instructions stored in the memory. The instructions may be executable by the processor to cause the apparatus to determine, for one or more RUs associated with the DU, one or more sampling metrics associated with signal combining operations at the one or more RUs, select, based on the one or more sampling metrics, a combining scheme to use for the signal combining operations, and provide an indication of the combining scheme to at least one RU of the one or more RUs.

Another apparatus for wireless communication at a DU associated with a base station is described. The apparatus may include means for determining, for one or more RUs associated with the DU, one or more sampling metrics associated with signal combining operations at the one or more RUs, means for selecting, based on the one or more sampling metrics, a combining scheme to use for the signal combining operations, and means for providing an indication of the combining scheme to at least one RU of the one or more RUs.

A non-transitory computer-readable medium storing code for wireless communication at a DU associated with a base station is described. The code may include instructions executable by a processor to determine, for one or more RUs associated with the DU, one or more sampling metrics associated with signal combining operations at the one or more RUs, select, based on the one or more sampling metrics, a combining scheme to use for the signal combining operations, and provide an indication of the combining scheme to at least one RU of the one or more RUs.

Some examples of the method, apparatuses, and non-transitory computer-readable medium described herein may further include operations, features, means, or instructions for identifying, for each RU of the one or more RUs, a coarse SNR for a channel associated with the signal combining operations of the RU, where the one or more sampling metrics include the coarse SNR for each RU and selecting the combining scheme to use for the signal combining operations for each RU based on the coarse SNR of each RU, where the indication provided to each RU indicates the combining scheme selected for each RU.

Some examples of the method, apparatuses, and non-transitory computer-readable medium described herein may further include operations, features, means, or instructions for receiving information identifying the combining scheme from a FHM associated with the DU.

Some examples of the method, apparatuses, and non-transitory computer-readable medium described herein may further include operations, features, means, or instructions for obtaining information identifying the coarse SNR for each RU of the one or more RUs, where identifying the coarse SNR may be based on the information.

Some examples of the method, apparatuses, and non-transitory computer-readable medium described herein may further include operations, features, means, or instructions for measuring an average noise level on one or more subcarriers associated with the one or more RUs, where identifying the coarse SNR may be based on the measuring.

Some examples of the method, apparatuses, and non-transitory computer-readable medium described herein may further include operations, features, means, or instructions for identifying, for each RU of the one or more RUs, a timing delay associated with the signal combining operations of the RU, where the one or more sampling metrics include the timing delay for each RU and selecting the combining scheme to use for signal combining operations for each RU based on the timing delay of each RU, where the indication provided to each RU indicates the combining scheme selected for each RU.

In some examples of the method, apparatuses, and non-transitory computer-readable medium described herein, the timing delay includes a first timing delay of a first RU that may be relative to a second timing delay of a second RU, and the combining scheme selected for each RU adjusts the first timing delay relative to the second timing delay, the second timing delay relative to the first timing delay, or both.

Some examples of the method, apparatuses, and non-transitory computer-readable medium described herein may further include operations, features, means, or instructions for obtaining information identifying the timing delay for each RU of the one or more RUs, where identifying the timing delay may be based on the information.

Some examples of the method, apparatuses, and non-transitory computer-readable medium described herein may further include operations, features, means, or instructions for measuring the timing delay for the one or more RUs, where identifying the timing delay may be based on the measuring.

Some examples of the method, apparatuses, and non-transitory computer-readable medium described herein may further include operations, features, means, or instructions for identifying, for each RU of the one or more RUs, a clamp count limit associated with the signal combining operations of the RU, where the one or more sampling metrics include the clamp count limit for each RU and selecting the combining scheme for each RU to use for signal combining operations based on the clamp count limit of the RU, where the indication provided to each RU indicates the combining scheme selected for each RU.

In some examples of the method, apparatuses, and non-transitory computer-readable medium described herein, the combining scheme includes at least one of a simple combining scheme, an equal gain combining scheme, a maximal ratio combining scheme, a selection combining scheme, a tuning combining scheme where a first timing delay of a first RU may be adjusted relative to a second timing delay of a second RU, or a combination thereof.

A method for wireless communication at a RU associated with a DU of a base station is described. The method may include obtaining an indication of a combining scheme selected for the RU to be used for signal combining operations at the RU, the combining scheme selected based on one or more sampling metrics associated with signal combining operations at the one or more RUs, performing, according to the combining scheme, the signal combining operations using signal samples obtained by the RU to obtain a combined signal, and providing the combined signal for output to the DU.

An apparatus for wireless communication at a RU associated with a DU of a base station is described. The apparatus may include a processor, memory coupled with the processor, and instructions stored in the memory. The instructions may be executable by the processor to cause the apparatus to obtain an indication of a combining scheme selected for the RU to be used for signal combining operations at the RU, the combining scheme selected based on one or more sampling metrics associated with signal combining operations at the one or more RUs, perform, according to the combining scheme, the signal combining operations using signal samples obtained by the RU to obtain a combined signal, and provide the combined signal for output to the DU.

Another apparatus for wireless communication at a RU associated with a DU of a base station is described. The apparatus may include means for obtaining an indication of a combining scheme selected for the RU to be used for signal combining operations at the RU, the combining scheme selected based on one or more sampling metrics associated with signal combining operations at the one or more RUs, means for performing, according to the combining scheme, the signal combining operations using signal samples obtained by the RU to obtain a combined signal, and means for providing the combined signal for output to the DU.

A non-transitory computer-readable medium storing code for wireless communication at a RU associated with a DU of a base station is described. The code may include instructions executable by a processor to obtain an indication of a combining scheme selected for the RU to be used for signal combining operations at the RU, the combining scheme selected based on one or more sampling metrics associated with signal combining operations at the one or more RUs, perform, according to the combining scheme, the signal combining operations using signal samples obtained by the RU to obtain a combined signal, and provide the combined signal for output to the DU.

Some examples of the method, apparatuses, and non-transitory computer-readable medium described herein may further include operations, features, means, or instructions for providing information identifying a coarse SNR for the RU, where the one or more sampling metrics include the coarse SNR for the RU and the combining scheme may be based on the coarse SNR of the RU.

Some examples of the method, apparatuses, and non-transitory computer-readable medium described herein may further include operations, features, means, or instructions for measuring an average noise level on one or more subcarriers associated with the RU and identifying the coarse SNR for the RU based on the measuring, where the information may be provided based on the identifying.

Some examples of the method, apparatuses, and non-transitory computer-readable medium described herein may further include operations, features, means, or instructions for providing information identifying a timing delay associated with the signal combining operations of the RU, where the one or more sampling metrics include the timing delay for the RU.

In some examples of the method, apparatuses, and non-transitory computer-readable medium described herein, the timing delay of the RU may be relative to a second timing delay of a second RU and the combining scheme selected for the RU adjusts the timing delay relative to the second timing delay, the second timing delay relative to the timing delay, or both.

Some examples of the method, apparatuses, and non-transitory computer-readable medium described herein may further include operations, features, means, or instructions for measuring the timing delay for the RU, where the information may be provided based on the measuring.

Some examples of the method, apparatuses, and non-transitory computer-readable medium described herein may further include operations, features, means, or instructions for providing information identifying a clamp count limit associated with the signal combining operations of the RU, where the one or more sampling metrics include the clamp count limit for each RU.

In some examples of the method, apparatuses, and non-transitory computer-readable medium described herein, the combining scheme includes at least one of a simple combining scheme, an equal gain combining scheme, a maximal ratio combining scheme, a selection combining scheme, a tuning combining scheme where a timing delay of the RU may be adjusted relative to a second timing delay of a second RU, or a combination thereof.

BRIEF DESCRIPTION OF THE DRAWINGS

FIGS. 9 through 13 show flowcharts illustrating methods that support combining schemes for shared open radio access networks in accordance with aspects of the present disclosure.

DETAILED DESCRIPTION

Figure 1:
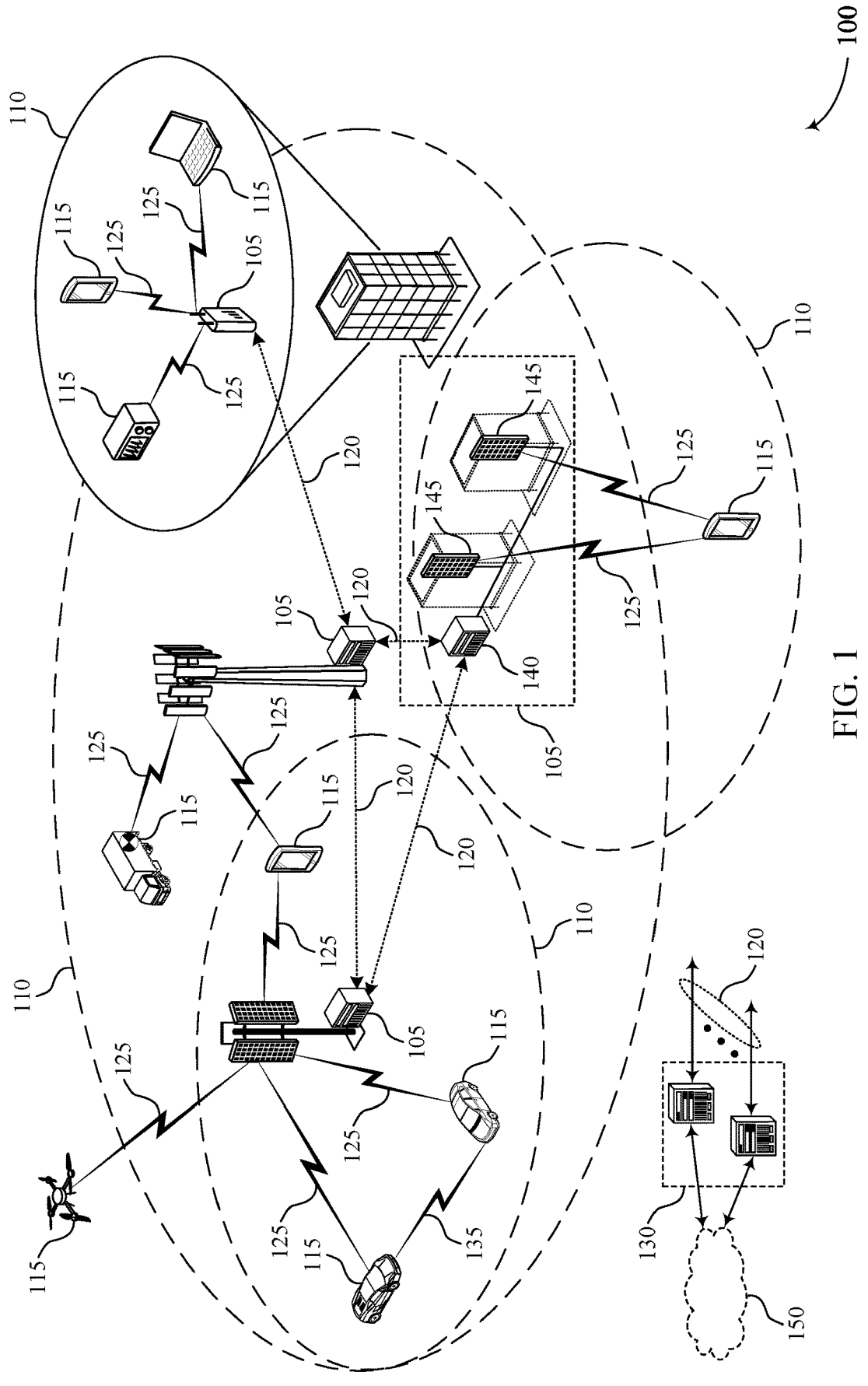
FIG. 1 illustrates an example of a wireless communication system that supports combining schemes for shared open radio access networks in accordance with aspects of the present disclosure.

A radio access network (RAN) may follow a central unit (CU)/distributed unit (DU) split architecture within the base station where the CU manages one or more DUs. Each DU may manage one or more aspects of a radio unit (RU) (e.g., a radio head). The RUs generally operate at the physical layer (L1). The RUs may be arranged in a fronthaul multiplexing (FHM) configuration (e.g., spoke/wheel configuration with a FHM coupling the RUs to the DU). The DU in the FHM mode may perform signal combining where signal samples received over the wireless medium (e.g., at L1) are combined for further processing/signal recovery. However, the combining scheme provided in the current configurations is not optimal in many scenarios, which may degrade system performance. For example, current configurations do not provide a mechanism where the combining scheme is selected to account for variations in the different conditions each RU is experiencing, that may disrupt the combining operations. Moreover, aspects of the described techniques provide for a cascade DU/RU configuration where the signal combining is performed at each RU as the signal samples are passed upstream to the DU.

Aspects of the disclosure are initially described in the context of wireless communication systems. Broadly, aspects of the described techniques support various mechanisms that improve wireless communications within a CU/DU split configuration within a base station in an open radio access network (O-RAN) architecture. The CU/DU split may include a CU function performed at or by the base station, with the CU managing aspects of communications for one or more DU functions. Each DU function may manage one or more RU(s) (e.g., radio heads) performing wireless communications with user equipment (UE). A DU function of the base station may determine various "sampling metrics" for the RUs it manages or is otherwise associated with. The sampling metrics may correspond to a coarse signal-to-noise ratio (SNR), a timing delay (e.g., a timing delay relative to each RU), a clamping count limit, etc., for each RU. The DU may measure aspects of the sampling metric directly, may obtain the sampling metric from a fronthaul multiplexer (FHM) associated with the DU, and/or may obtain the sampling metric from each respective RU. The DU may then use the sampling metric to select the combining scheme to be used by each RU to account for excessive noise, timing delays, etc. For example, RUs connected in a cascaded mode may combine the signal samples they received over-the-air with signal samples received from downstream RU(s). The combined signal samples may then be passed upstream to be combined with the signal samples of upstream RU(s) or passed to the DU if there are no upstream RU(s). For example, the clamping count exceeding a threshold (e.g., combined signal sample power>THRESHOLD) may signal that at least one RU is too close to the transmitting UE, and therefore the DU may scale down the over-the-air signals for RU(s) being saturated to avoid interference in the combining operations. The DU may provide an indication of the selected combining scheme to each RU, which uses the combing scheme for combining operations. The combining scheme selected for each RU may be updated to account for changing conditions regarding the sampling metric. Accordingly, the described techniques address non-optimal combining schemes according to some configurations. Moreover, configuring the DU/RU in a cascaded manner permits the RU(s) to combine signal samples at each RU level, therefore reducing the processing load of the DU (e.g., spreading the combining operations processing at the RU(s)).

Aspects of the disclosure are further illustrated by and described with reference to apparatus diagrams, system diagrams, and flowcharts that relate to combining schemes for shared open radio access networks.

FIG. 1 illustrates an example of a wireless communication system 100 that supports combining schemes for shared open radio access networks in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (A f) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an associa- tion with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic cov- erage areas 110 may be supported by the same base station 105. In other examples, the overlapping geographic cover- age areas 110 associated with different technologies may be supported by different base stations 105. The wireless com- munication system 100 may include, for example, a hetero- geneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The tech- niques described herein may be used for either synchronous or asynchronous operations.

Some UEs 115, such as MTC or IoT devices, may be low cost or low complexity devices and may provide for auto- mated communication between machines (e.g., via Machine-to-Machine (M2M) communication). M2M com- munication or MTC may refer to data communication tech- nologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access con- trol, and transaction-based business charging.

Some UEs 115 may be configured to employ operating modes that reduce power consumption, such as half-duplex communications (e.g., a mode that supports one-way com- munication via transmission or reception, but not transmis- sion and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband commu- nications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be config- ured to support ultra-reliable communications or low-la- tency communications, or various combinations thereof. For example, the wireless communication system 100 may be configured to support ultra-reliable low-latency communi- cations (URLLC) or mission critical communications. The UEs 115 may be designed to support ultra-reliable, low- latency, or critical functions (e.g., mission critical func- tions). Ultra-reliable communications may include private communication or group communication and may be sup- ported by one or more mission critical services such as mission critical push-to-talk (MCPTT), mission critical video (MCVideo), or mission critical data (MCData). Sup- port for mission critical functions may include prioritization of services, and mission critical services may be used for public safety or general commercial applications. The terms ultra-reliable, low-latency, mission critical, and ultra-reli- able low-latency may be used interchangeably herein.

In some examples, a UE 115 may also be able to com- municate directly with other UEs 115 over a device-to- device (D2D) communication link 135 (e.g., using a peer- to-peer (P2P) or D2D protocol). One or more UEs 115 utilizing D2D communications may be within the geo- graphic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combi- nation of these. A vehicle may signal information related to traffic conditions, signal scheduling, weather, safety, emer- gencies, or any other information relevant to a V2X system. In some examples, vehicles in a V2X system may commu- nicate with roadside infrastructure, such as roadside units, or with the network via one or more network nodes (e.g., base stations 105) using vehicle-to-network (V2N) communica- tions, or with both.

The core network 130 may provide user authentication, access authorization, tracking, Internet Protocol (IP) con- nectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external net- works (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, radio units, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 (e.g., a DU function/component at or within the base station 105) may determine, for one or more RUs associated with the DU, one or more sampling metrics associated with signal combining operations at the RUs. The base station 105 may select, based at least in part on the one or more sampling metrics, a combining scheme to use for the signal combining operations. The base station 105 may provide an indication of the selected combining scheme to at least one RU of the one or more RUs.

A base station (e.g., a RU function/component at or within the base station 105) may obtain an indication of a combining scheme selected for the RU to be used for signal combining operations at the RU, the combining scheme selected based at least in part on one or more sampling metrics associated with signal combining operations at the RUs. The base station 105 may perform, according to the combining scheme, the signal combining operations using signal samples obtained by the RU to obtain a combined signal. The base station 105 may provide the combined signal for output to the DU.

Figure 2:
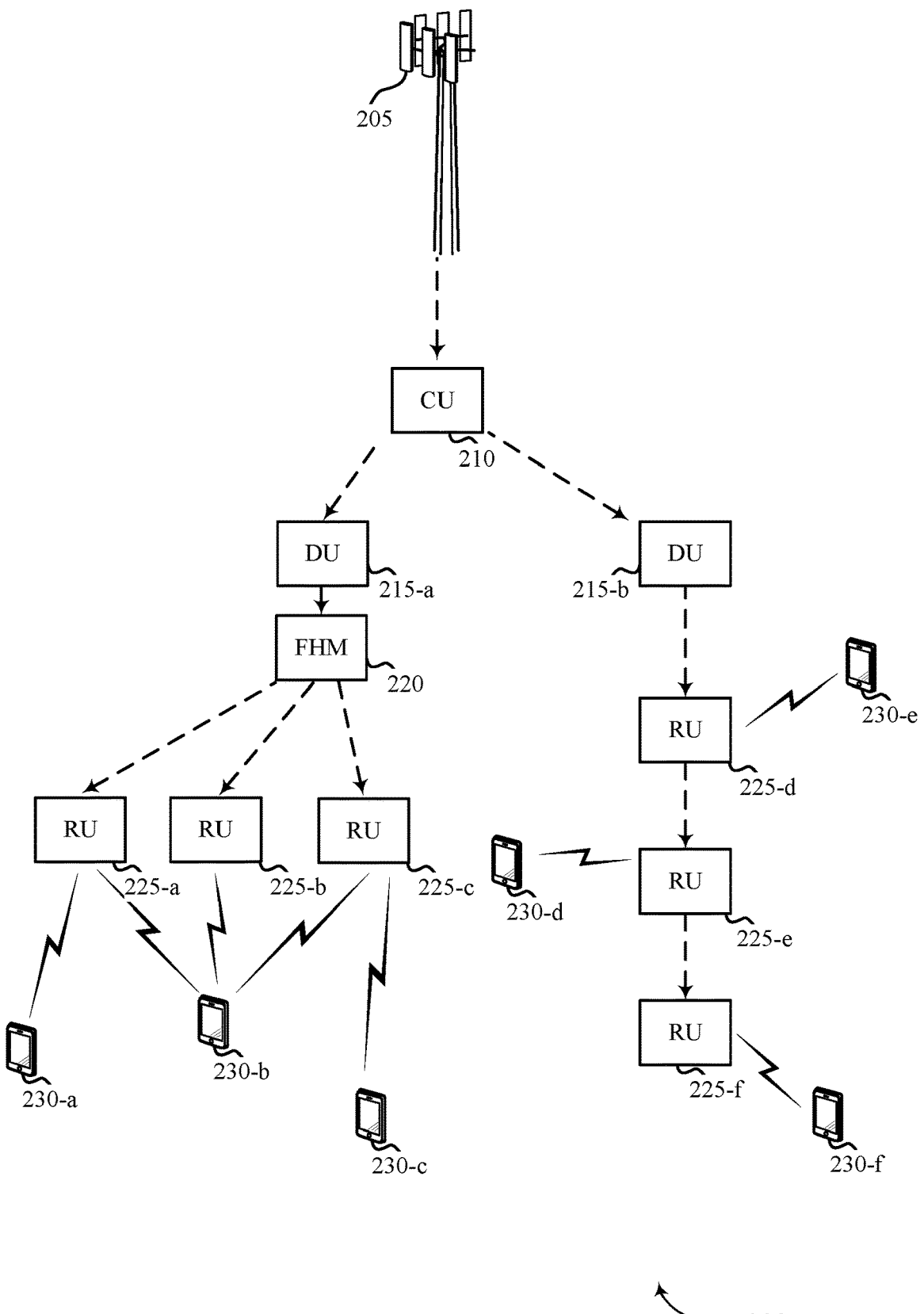
FIG. 2 illustrates an example of a wireless communication system that supports combining schemes for shared open radio access networks in accordance with aspects of the present disclosure.

FIG. 2 illustrates an example of a wireless communication system 200 that supports combining schemes for shared open radio access networks in accordance with aspects of the present disclosure. Wireless communication system 200 may implement aspects of wireless communication system 100. Wireless communication system 200 may include base station 205 and one or more UEs 230, which may be examples of the corresponding devices described herein. Base station 205 may include a CU 210, one or more DU 215, an FHM 220 (in some configurations), and/or one or more RU 225, which may be examples of the corresponding devices described herein. For example, CU 210, DU 215, FHM 220, and/or RU 225 may be functions/components implemented at or implemented by base station 205.

In some aspects, wireless communication system 200 may be an example of a RAN, such as an open-RAN (O-RAN). Broadly, a RAN comprises the link between the network and a UE 230, which includes base station 205. Typically, the components of the RAN are vendor-specific in that a service provider deploys the RAN architecture, with each component/function within the RAN being specific to the vendor (e.g., may be interoperable with RAN components/functions deployed by a different vendor). An O-RAN, on the other hand, may include functions/components within the RAN being fully interoperable with functions/components deployed by other vendors. Similar to the traditional RAN architecture, an O-RAN may also use the CU/DU split architecture (e.g., a CU 210, one or more DU(s) 215, with two DUs 215 being shown by way of example only, and one or more RUs 225, with three RUs 225 per/DU 215 being shown by way of example only). The RU 225 generally implements the L1 functionality of the RAN, e.g., where the radio frequency signals are transmitted/received, amplified, digitized, etc. The RUs 225 may be located near the antennas and the DU 215, in some examples. The CU 210 may be located closer to the core network (e.g., near base station 205). FHM 220 may serve as an interface between the RU 225 and DU 215 and may multiplex information received from RUs 225 before providing the information to DU 215 and/or demultiplex information received from DU 215 before providing the information to the RUs 225. Accordingly, references to CU 210, DU 215, FHM 220, and/or RU 225 may refer to O-CU, O-DU, O-FHM, and/or O-RU, respectively.

A shared cell deployment in an O-RAN architecture may include each RU 225 combining incoming samples before sending the I/Q samples from the RU 225 to the DU 215. Broadly, there are at least two modes defined for the O-RAN architecture utilizing the CU/DU split. A first mode may include an FHM mode where FHM 220 retrieves compression information (if available) along with I and Q samples via signaling from all connected O-RUs (e.g., from each RU 225). The FHM mode is illustrated in FIG. 2 via DU 215-a, FHM 220, RU 225-a, RU 225-b, and RU 225-c. Each RU 225 may be associated with or otherwise perform wireless communications with one or more UEs 230. In the non-limiting example illustrated in FIG. 2, RU 225-a may be associated with UE 230-a and UE 230-b, RU 225-b may be associated with UE 230-b, and/or RU 225-c may be associated with UE 230-b and UE 230-c.

In the FHM mode, FHM 220 may generally combine and compress the samples received from RUs 225 before sending them to DU 215-a. As one non-limiting example, if user plane (U-Plane) data compression is used, this may include FHM 220 using the following combining scheme: Combined iSample=Compress (Sum (Decompress(iSample_#1), . . . , Decompress(iSample_#N_m))), and Combined qSample=Compress(Sum(Decompress(qSample_#1, . . . , Decompress(qSample_#N_m))). If U-Plane compression is not used, the combining scheme may use the following: Combined iSample=Sum(iSample_#1), . . . , iSample_#N_m), and Combined qSample=Sum(qSample_#1, . . . , qSample_#N_m). iSample_#N may correspond to the iSample received from the O-RU #n and qSample_#N may correspond to the qSample received from O-RU #n.

Another example architecture may include a cascaded O-RU mode. This is illustrated in FIG. 2 with DU 215-b, RU 225-d, RU 225-e, and RU 225-f. The cascaded O-RU retrieves compression information (if available) along with the I and Q samples via messaging from the south node O-RU (e.g., the trailing or downstream O-RU). Each upstream RU 225 may combine its I and Q samples received over-the-air (e.g., the samples that particular RU 225 receives from the wireless channel) before the compression to send to the next RU 225/DU 215-b (e.g., to send the combined sample upstream). If U-Plane compression is used, then the combining scheme may use: Combined iSample=Compress(Sum(Decompress(iSample_ from_south-node) and (iSample_from_air))), and Combined qSample=Compress(Sum(Decompress(qSample_ from_south-node) and (qSample_from_air))). If compression is not used, the combining scheme may use: Combined iSample=Sum(iSample_from_south-node and iSample_from_air) and qSample=Sum(qSample_from_south-node and qSample_from_air). iSample_from_south-node may correspond to the iSample received from the south node (e.g., the downstream node, such as RU 225-f is a downstream node with respect to RU 225-e). qSample_from_south-node may correspond to the qSample received from the south node. iSample_from_air is the iSample received from the air (e.g., the signal sample received wirelessly based on a transmission from a UE 230 associated with the RU 225) by the RU 225. qSample_from_air is the qSample received from the air (e.g., the signal sample received wirelessly based on a transmission from a UE 230 associated with the RU 225).

However, these approaches, in some examples, may degrade link performance within the network. One issue may relate to the combining scheme discussed above being less than optimal in some scenarios. Generally, there are multiple possible ways to combine samples, where the combining gain may depend on various factors, such as the SNR of the I and Q samples received from particular RUs 225. Additionally, or alternatively, the combining gain may be maximized when the signals are combined coherently. However current configurations do not provide a mechanism for pre-processing to achieve such coherency before the combining operations.

Example combining schemes that may be implemented according to aspects of the described techniques may include, but are not limited to, a simple combining scheme, an equal gain combining scheme (e.g., post synchronization), a maximal ratio combining (MRC) combining scheme, a selection combining scheme, a tuning combining scheme where a timing delay at one RU 225 is adjusted based on timing delay from other RU 25), and the like. The simple combining scheme may be easy to implement, but may be ineffective if one of the RUs 225 is receiving a poor signal over-the-air (e.g., receiving a signal at a receive power level that fails to satisfy a threshold). This may result in degraded post combining SNR in some cases when one RU 225 is exposed to interference (e.g., when a UE 230 is very close to the RU 225, with the RU 225 being saturated by the transmissions from the UE 230). The equal gain combining scheme may be an improved version of the simple combining scheme in that the data streams are synchronized before combining. This may be associated with data directed synchronization scheme where the RU 225 is not aware of the DMRS resource elements. Achieving synchronization may not be possible in some situations (e.g., at low SNRs when the data directed schemes are used).

The MRC combining scheme may be a complex approach that uses synchronization to achieve the combining gain. The combining weight computation per-RU 225 may not be accurate at low SNRs, which may cause degradation of the effective SNR observed post combining. Again, achieving synchronization may not be possible in some situations (e.g., low SNRs as the 5G-NR network generally operates at very low SNRs). The selection combining scheme may select samples from RU(s) 225 based on the average energy computed during a slot. When the received signal strength is similar on each RU 225, selection combining may miss the opportunity to achieve combining gain. The tuning combining scheme may generally relate to tuning or otherwise adjusting each, some, or all of the RU 225 based on the timing delay of each RU 225 (e.g., to mitigate timing delays at each RU 225 based on propagation delays).

Another issue with such combining schemes may include, in post combining, the I and Q samples may be clamped to a maximum value supported by the compression scheme. Such clamping may be associated with saturation and may result in distortion of the combined signal, resulting in poor SNR. That is, some configurations may be such that, if overflow occurs from the combining operation, the iSample and/or qSample should be clamped to the closest value that can be represented in the compression format used for the combined I/Q data. This clamping operation at some RU 225 may disrupt combining operations at other RU 225 (e.g., upstream RU 225 and/or FHM 220).

Accordingly, aspects of the described techniques provide various mechanisms that may be used to provide a combining scheme that achieves optimal combining operation performance based on various sampling metrics (e.g., signal strength/quality metrics, timing delays, clamping count limits, etc.). Broadly, the described techniques provide an enhanced combining approach that may be adopted for wireless communication system 200.

For example, sampling metric(s) (e.g., one or more) may be identified for one or more of RUs 225. The sampling metric(s) may be on a per-RU basis such that the conditions experienced by each RU 225 may be uniquely identified according to its sampling metric(s), and compensated for as needed. Examples of the sampling metric(s) may include, but are not limited to, a coarse SNR for a channel (e.g., the channel between the RU 225 and its associated UE 230), timing delays (e.g., relative timing delays based on signal delays observed by each RU 225), clamping limits, and the like, for the signal combining operations. The sampling metric(s) may be identified by DU 215 and/or RU 225, e.g., based on measurements and/or based on the sampling metric(s) being indicated to DU 215 by each RU 225. Based on the identified sampling metric(s), DU 215 may select a combining scheme for all, some, or one of the RU 225 to use for signal combining operations at the respective RU 225. DU 215 may provide an indication of the selected combining scheme to all, some, or at least one of the RU 225. Accordingly, aspects of the described techniques provide mechanisms that enable updating the combining scheme used by each RU 225 based on the sample metric(s) of the respective RU 225.

Accordingly, aspects of the described techniques may include the south node O-RU (e.g., RU 225-f is a south node with respect to RU 225-e, RU 225-e is a south node with respect to RU 225-d, etc.) providing frequency domain I/Q samples along with an average noise level computed in the slot (e.g., the noise floor observed during the slot). The average noise level may be computed such as by computing the average noise level using Fast Fourier Transform (FFT) techniques based on unused tones (such as edge tones) from each symbol during the slot, and averaging them to compute the average noise level per slot. Once an estimate of the average noise level is available, a coarse SNR per section for an O-RU may be computed based on the average energy obtained from sub-carriers occupying the section (e.g., the subcarriers used during the slot) in the slot divided by the average noise value.

In some aspects, there may be a slight difference in the operation at an FHM O-RU (e.g., RU 225-a) and at a cascaded O-RU (e.g., RU 225-e) mode. For example, in the FHM Mode, FHM 220 may compute (e.g., measure) the coarse SNR per section for all of the O-RUs. In the cascaded O-RU mode, each south node O-RU may pass the coarse SNR per section information to the leading O-RU (e.g., the upstream RU) along with the average noise level of the samples received over-the-air.

FHM 220 in the FHM mode and/or the last O-RU in the cascaded chain (e.g., RU 225-d) connected to the O-DU may send the combined I/Q samples and per section coarse SNR information to the O-DU (e.g., DU 215) for all associated O-RUs. Based on the coarse SNRs obtained for all the connected O-RUs, O-DU may decide the combining scheme at FHM 220 (e.g., FHM may manage aspects of selecting the combining scheme and signaling this to DU 215-a) and for the cascaded O-RUs. One non-limiting solutions at O-DU (e.g., DU 215) may be to consider the SNR/signal-quality-metric from received I/Q samples and compare those with the per section coarse SNR of individual O-RUs. DU 215 may identify or otherwise select the combining scheme based on the comparison.

In the situation where the received signal (combined signal) is poorer than the expected SNR for the per-section coarse SNR, O-DU (e.g., DU 215) may take various corrective actions. One corrective action may include changing (e.g., selecting) the combining scheme per section/O-RU to select a combining scheme or any other schemes that maximizes the combining gain. Another corrective action may include disabling some of the O-RUs which are causing degradation (e.g., O-RUs exposed to high interference).

Some aspects of the described techniques may include RU 225 and/or FHM 220 in some configurations, maintaining a counter for counting the number of clamping(s) per section, converting the final count to a percent of samples that were clamped, and passing this information to the O-DU (e.g., DU 215). In such cases, O-DU may obtain additional information, e.g., in addition to considering incoming samples SNR/signal-quality-metric. In such scenarios, when the clamping percentage is very high, O-DU can take various corrective actions. One corrective action may include reusing the coarse SNR metric available per section for the connected O-RUs to decide the set of O-RUs that are causing clamping. The O-DU may scale down the O-RU(s) (e.g., reduce the transmit power level of UE(s) saturating the O-RU) associated with low SNR, but with a high received power level (e.g., the most interference O-RUs). Another corrective action may include O-DU changing the combining scheme to avoid clamping. Another corrective action may include O-DU optimizing the received power per section by controlling the transmit power of UEs 230 scheduled in that section/sections so that degradation in the combined I/Q samples can be minimized. Yet another corrective action may include O-DU apply a scaling (scale down) factor at the O-RU based on O-DU feedback, that is based on the clamping percentage.

Accordingly, aspects of the described techniques may include DU 215 using the sampling metrics associated with RU 225 to identify or otherwise select an optimal combining scheme that is responsive to the conditions experienced by each RU 225. Each RU may obtain (e.g., via backhaul signaling) an indication of the selected combining scheme and perform combining operations accordingly. As conditions change at an RU 225, the combining scheme may be updated by DU 215 to mitigate negative impacts of those changes. Moreover, as conditions improve, DU 215 may select a simpler combining scheme for the RU 225 to improve efficiency, operations, etc.

Figure 3:
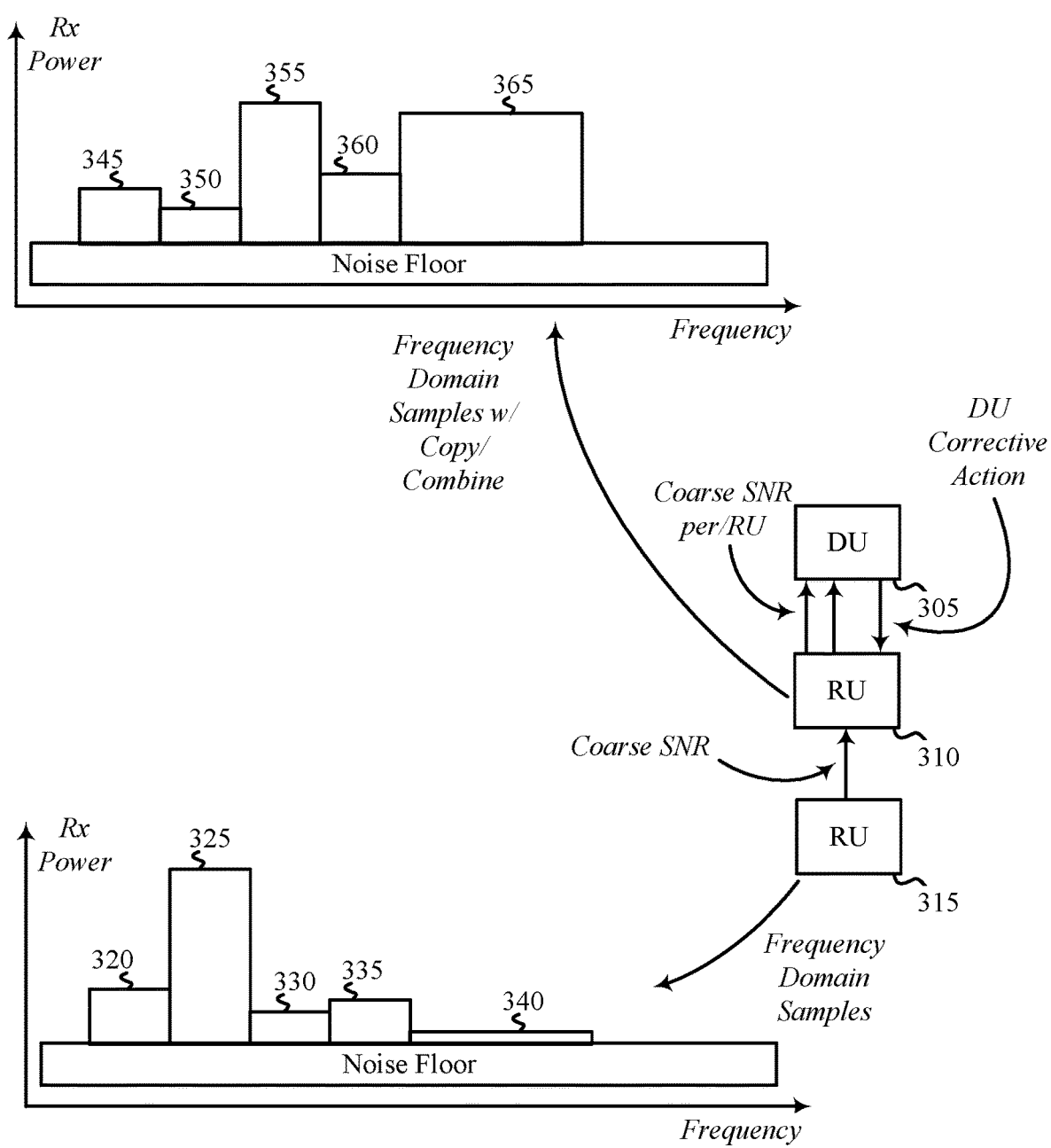
FIG. 3 illustrates an example of a wireless communication system that supports combining schemes for shared open radio access networks in accordance with aspects of the present disclosure.

FIG. 3 illustrates an example of a wireless communication system 300 that supports combining schemes for shared open radio access networks in accordance with aspects of the present disclosure. Wireless communication system 300 may implement aspects of wireless communication systems 100 and/or 200. Wireless communication system 300 may be implemented at or by DU 305, RU 310, and/or RU 315, which may be examples of the corresponding devices described herein. In some aspects, DU 305, RU 310, and/or RU 315 may be configured as, or otherwise support, an O-RAN architecture where DU 305 is an example of a O-DU and RU 310 and/or RU 315 may be examples of O-RUs. Wireless communication system 300 illustrates an example of a cascade mode configuration of the O-RAN.

As discussed above, aspects of the described techniques may include DU 305, RU 310, and/or RU 315 identifying sampling metric(s) associated with each O-RU. The sampling metric(s) may include a coarse SNR for each RU, a timing delay (e.g., a relative timing delay), a clamping count limit, and the like. For example, DU 305 (e.g., and/por an FHM in an FHM mode) and/or RU 310/RU 315 may measure the coarse SNR, timing delay, etc., associated with each O-RU. In another example, RU 310 and/or RU 315 may measure the coarse SNR, timing delay, etc., and then provide this information to DU 305. DU 305 may select a combining scheme for each/all of the RUs based on the sampling metric(s). DU 305 may signal an indication of the selected combining scheme to each RU, which may perform signal combining operations according to the indicated combining scheme.

For example, RU 315 may measure an average noise level on associated subcarrier(s) (e.g., during a slot). The average noise level may be based on the noise floor (e.g., the level of background noise present on the channel during the slot). RU 315 may measure the average noise level for the section within the slot, which may span various subcarriers used within the slot. RU 315 may use the average noise level to identify the coarse SNR for the channel (e.g., for the subcarriers). For example, RU 315 may divide the average noise level by the coarse SNR. The coarse SNR in this example may correspond to the sampling metric(s) associated with RU 315. RU 315 may provide for output an indication of the coarse SNR to RU 310 (e.g., the upstream O-RU with respect to RU 315). RU 310 may also measure its average noise level for the section within the slot, which also spans various subcarriers used with the slot. RU 310 may use the average noise level (e.g., the noise floor) to identify the coarse SNR for the channel. Again, the coarse SNR in this example may correspond to the sampling metric(s) associated with RU 310. RU 310 may provide for output an indication of its coarse SNR as well as the indication of the coarse SNR of RU 315 to DU 305. The coarse SNR may be measured at the edge tones (e.g., subcarriers within the slot that are unused and near the end of the channel/bandwidth of the slot).

DU 305 may receive the sampling metric(s) (e.g., the coarse SNR in this example) and select a combining scheme to be used for combining operations at RU 310 and/or RU 315 based on the sampling metrics. Accordingly, DU 305 may provide for output (e.g., via a backhaul link) an indication of the selected combining scheme to RU 315, which may pass (e.g., relay) the indication of the combining scheme selected for RU 315 to RU 315.

RU 315 and RU 310 may then perform combining operations using the indicated combining scheme selected by DU 305. For example, RU 315 may measure frequency domain samples consisting of a first receive power level 320 for a first subcarrier, a second receive power level 325 for a second subcarrier, a third receive power level 330 for a third subcarrier, a fourth receive power level 335 for a fourth subcarrier, and a fifth receive power level 340 for a fifth subcarrier. RU 315 may provide an indication of the samples (e.g., I/Q samples) to RU 310, along with the indication of the sampling metric. RU 310 may measure its frequency domain samples, which are combined with the frequency domain samples received from RU 315. This may result in a combined frequency domain samples consisting of a first combined receive power level 345 for a first subcarrier, a second combined receive power level 350 for a second subcarrier, a third combined receive power level 355 for a third subcarrier, a fourth combined receive power level 360 for a fourth subcarrier, and a fifth combined receive power level 365 for a fifth subcarrier. RU 310 may provide the combined samples to DU 305 for further processing/data recovery.

Figure 4:
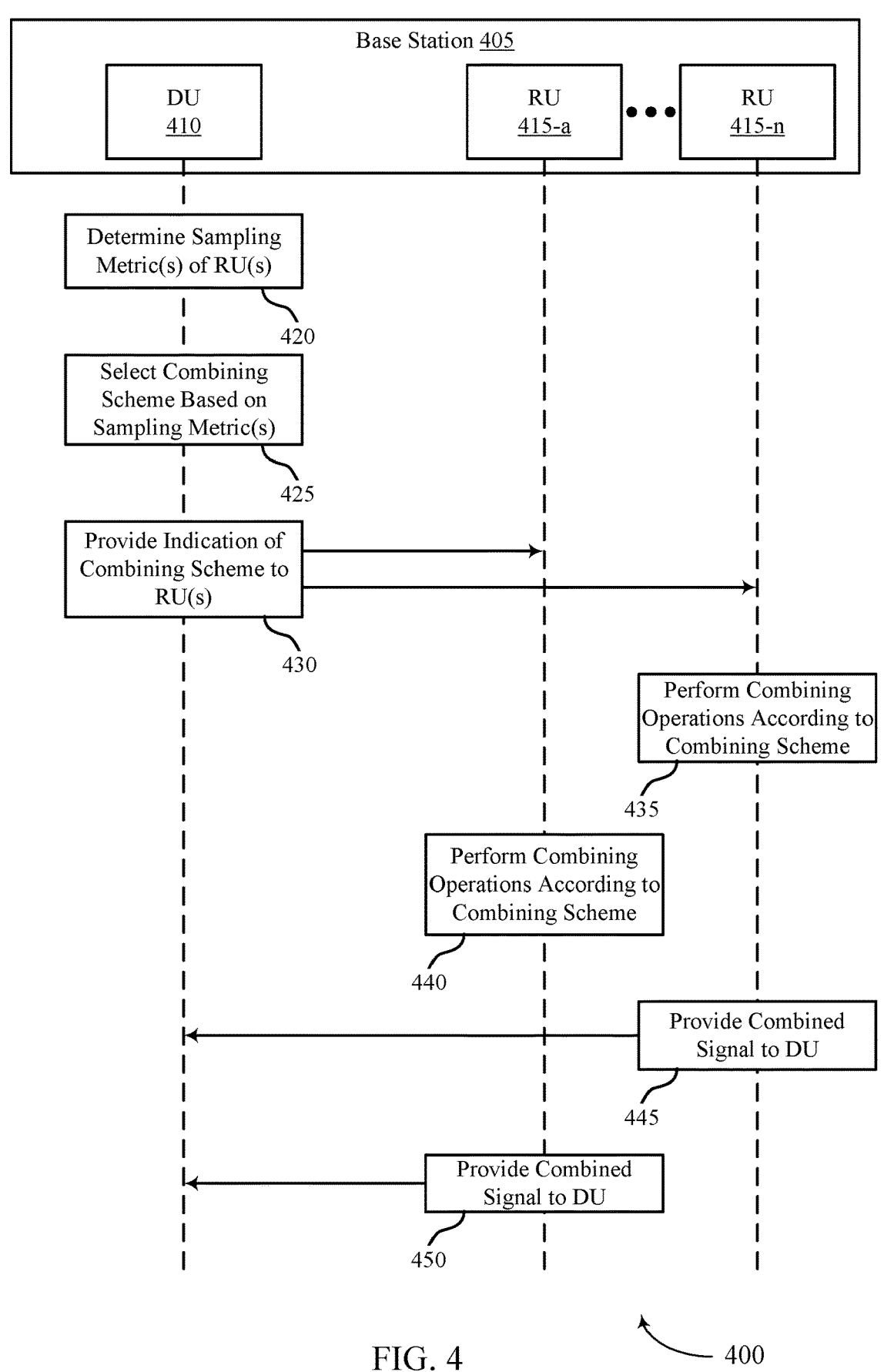
FIG. 4 illustrates an example of a process that supports combining schemes for shared open radio access networks in accordance with aspects of the present disclosure.

FIG. 4 illustrates an example of a process 400 that supports combining schemes for shared open radio access networks in accordance with aspects of the present disclosure. Process 400 may implement aspects of wireless communication systems 100, 200, and/or 300. Process 400 may be implemented at or implemented by base station 405, which may include DU 410 and "n" RU 415, with n corresponding to a positive integer. Base station 405, DU 410 and/or RU 415 may be examples of the corresponding devices described herein.

At 420, DU 410 may identify or otherwise determine sampling metric(s) for one or more RU 415 (e.g., a sampling metric for RU 415-*a* and a sampling metric for RU 415-*n* in this example). Broadly, the sampling metrics may be associated with signal combining operations being performed at each RU. In some aspects, this may include DU 410 receiving an indication of the sampling metrics from RU 415. This may include DU 410 receiving an indication of the sampling metrics from an FHM functions/component coupled between DU 410 and RU 415. This may include DU 410 measuring one or more of the sampling metrics (e.g., such as a coarse SNR, average noise level, etc.). However, in some examples it may be more beneficial for each RU 415 to determine its own sampling metrics and provide this information to DU 410, either directly, via the FHM function/component, and/or via an upstream RU 415.

In some aspects, this may include DU 410 identifying a coarse SNR for a channel associated with the signal combining operations of the RU 415. DU 410 may determine the coarse SNR for each RU 415 based on receiving an indication of the coarse SNR from each RU 415. In this context, the coarse SNR may correspond to the sampling metric of the RU 415. In some aspects, the coarse SNR may be based on an average quality metric or signal level (e.g., a noise floor, interference level, etc., for the channel). In the FHM mode, this may include DU 410 receiving an indication of the coarse SNR from an FHM component/function.

In some aspects, this may include DU 410 identifying a timing delay associated with the signal combining operations of the RU 415. In this context, the timing delay may correspond to the sampling metric of the RU 415. In some aspects, the timing delay may be a relative timing delay. That is, each RU 415 may receive a signal transmitted from a UE at a different time, with the timing delay corresponding to the differences in the receive time of the signal at each RU 415. For example, UE 415-*a* may be associated with a first timing delay and RU 415-*n* may be associated with a second timing delay.

In some aspects, this may include DU 410 identifying a clamp count limit associated with the signal combining operations of the RU 415. In this context, the clamp count limit may correspond to the sampling metric of the RU 415. Broadly, the clamp count limit may correspond to the number of times and/or the ratio that the RU 415 must clamp a signal sample due to excessive received power levels. A number/ratio of signal clamping may indicate that the RU 415 is being saturated by the wireless signals, and therefore it may make sense for DU 410 to scale down the over-the-air signal that RU 415 is receiving, at least temporarily.

At 425, DU 410 may identify, determine, or otherwise select a combining scheme to use for the signal combining operations for each RU based on the sampling metrics of that RU. In some aspects, this may include DU 410 identifying or otherwise selecting the combining scheme based on the timing delay (e.g., the first timing delay of RU 415-*a* in relative to the second timing delay of RU 415-*n*). In some aspects, this may include DU 410 identifying or otherwise selecting the combining scheme based on the coarse SNR of the RU 415. In some aspects, this may include DU 410 identifying or otherwise selecting the combining scheme based on the clamp count limit associated with each RU 415. Accordingly, DU 410 may select a combining scheme for each RU 415 that improves signal combining operations of the RU 415 for the conditions that RU 415 is experiencing.

In some aspects, this may include DU 410 selecting a simple combining scheme, an equal gain combining scheme, and MRC scheme, a selection combining scheme, a tuning combining scheme (e.g., where a first timing delay of RU 415-*a* is adjusted or tuned relative to the second timing delay of RU 415-*n*, or vice versa), and the like. In some aspects, this may include DU 410 updating the selected combining scheme based on changes in conditions experienced by each RU 415, which may change the sampling metrics of the RU 415 and justify a different combining scheme being used to improve combining operations.

At 430, DU 410 may transmit or otherwise provide for output (and RU 415 may receive or otherwise obtain) an indication of the combining scheme selected for the RU 415. For example, DU 410 may provide the indication via a backhaul link and/or a wireless link between DU 410 and each RU 415. In the FHM mode, DU 410 may provide the indication of the selected combining scheme to each RU 415 via the FHM component/function. In the cascade configuration, DU 410 may provide the indication of the selected combining scheme to the parent RU 415, which may pass this information along to the relevant downstream RU 415(*s*).

At 435, RU 415-*n* may perform the signal combining operations according to the combining scheme using signal samples obtained by RU 415-*n*. For example, RU 415-*n* may receive its own signals over-the-air and combine those signal samples with other samples received from a downstream RU, if available. At 440, RU 415-*a* may perform the signal combining operations according to the combining scheme using signal samples obtained by RU 415-*a*. For example, RU 415-*a* may combine the signal samples it received over-the-air with signal samples received from downstream RU (e.g., RU 415-*n*) to obtain the combined signal.

At 445, RU 415-*n* may provide the combined signal for output to DU 410. Similarly and at 450, RU 415-*a* may provide the combined signal for output to DU 410. In an FHM mode, RU 415 may provide their signal samples to an FHM located between DU 410 and RU 415. In this example, the FHM function/component may combine the signal samples prior to delivering the combined signal simple to DU 410. In a cascaded mode, RU 415-*n* may receive over the air signals and pass those signals to an upstream RU (e.g., RU 415-*a*) to be combined with the signal samples of RU 415-*a* before being passed to DU 410.

Figure 5:
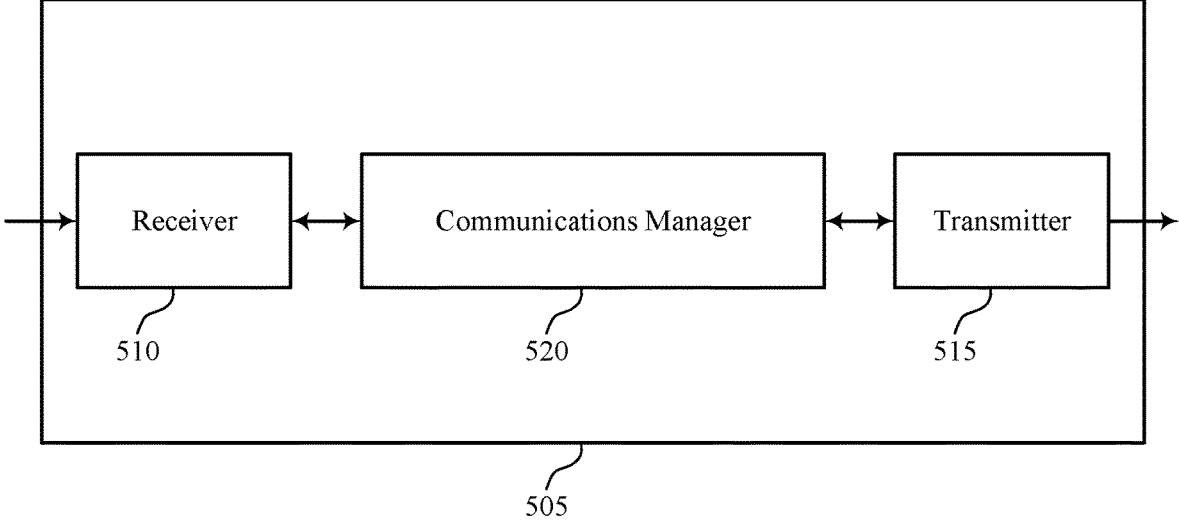
FIGS. 5 and 6 show block diagrams of devices that support combining schemes for shared open radio access networks in accordance with aspects of the present disclosure.

FIG. 5 shows a block diagram 500 of a device 505 that supports combining schemes for shared open radio access networks in accordance with aspects of the present disclosure. The device 505 may be an example of aspects of a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to combining schemes for shared open radio access networks). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to combining schemes for shared open radio access networks). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of combining schemes for shared open radio access networks as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a DU associated with a base station in accordance with examples as disclosed herein. For example, the communications manager 520 may be configured as or otherwise support a means for determining, for one or more radio units associated with the DU, one or more sampling metrics associated with signal combining operations at the one or more radio units. The communications manager 520 may be configured as or otherwise support a means for selecting, based on the one or more sampling metrics, a combining scheme to use for the signal combining operations. The communications manager 520 may be configured as or otherwise support a means for providing an indication of the combining scheme to at least one RU of the one or more RUs.

Additionally, or alternatively, the communications manager 520 may support wireless communication at a RU associated with a DU of a base station in accordance with examples as disclosed herein. For example, the communications manager 520 may be configured as or otherwise support a means for obtaining an indication of a combining scheme selected for the RU to be used for signal combining operations at the RU, the combining scheme selected based on one or more sampling metrics associated with signal combining operations at the one or more RUs. The communications manager 520 may be configured as or otherwise support a means for performing, according to the combining scheme, the signal combining operations using signal samples obtained by the RU to obtain a combined signal. The communications manager 520 may be configured as or otherwise support a means for providing the combined signal for output to the DU.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improving signal combining operations at a RU by selecting/updating the combining scheme for each RU based on the sampling metrics of that RU.

Figure 6:
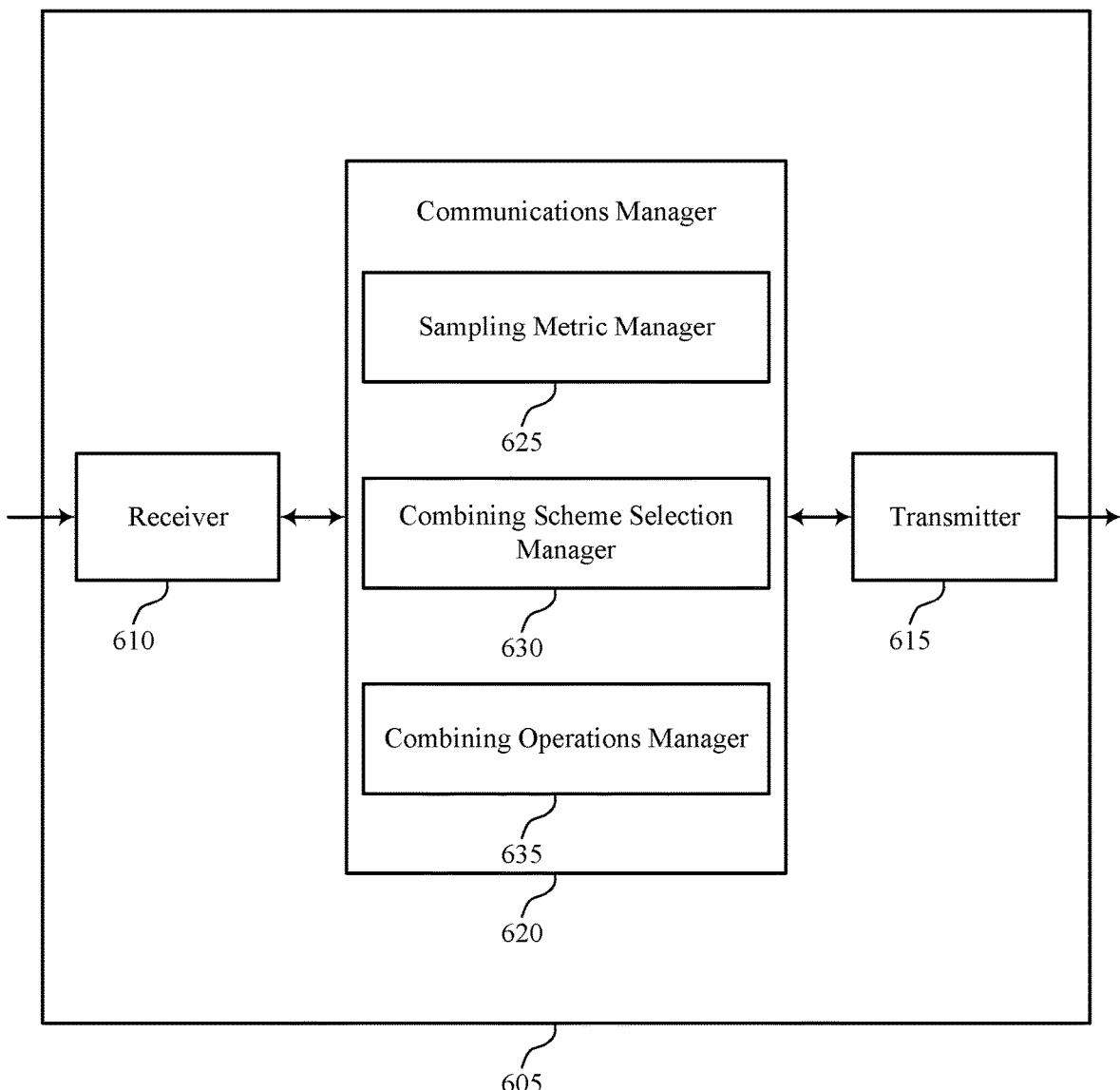

FIG. 6 shows a block diagram 600 of a device 605 that supports combining schemes for shared open radio access networks in accordance with aspects of the present disclosure. The device 605 may be an example of aspects of a device 505 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to combining schemes for shared open radio access networks). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to combining schemes for shared open radio access networks). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of combining schemes for shared open radio access networks as described herein. For example, the communications manager 620 may include a sampling metric manager 625, a combining scheme selection manager 630, a combining operations manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a DU associated with a base station in accordance with examples as disclosed herein. The sampling metric manager 625 may be configured as or otherwise support a means for determining, for one or more RUs associated with the DU, one or more sampling metrics associated with signal combining operations at the one or more RUs. The combining scheme selection manager 630 may be configured as or otherwise support a means for selecting, based on the one or more sampling metrics, a combining scheme to use for the signal combining operations. The combining scheme selection manager 630 may be configured as or otherwise support a means for providing an indication of the combining scheme to at least one RU of the one or more RUs.

Additionally, or alternatively, the communications manager 620 may support wireless communication at a RU associated with a DU of a base station in accordance with examples as disclosed herein. The combining scheme selection manager 630 may be configured as or otherwise support a means for obtaining an indication of a combining scheme selected for the RU to be used for signal combining operations at the RU, the combining scheme selected based on one or more sampling metrics associated with signal combining operations at the one or more RUs. The combining operations manager 635 may be configured as or otherwise support a means for performing, according to the combining scheme, the signal combining operations using signal samples obtained by the RU to obtain a combined signal. The combining operations manager 635 may be configured as or otherwise support a means for providing the combined signal for output to the DU.

Figure 7:
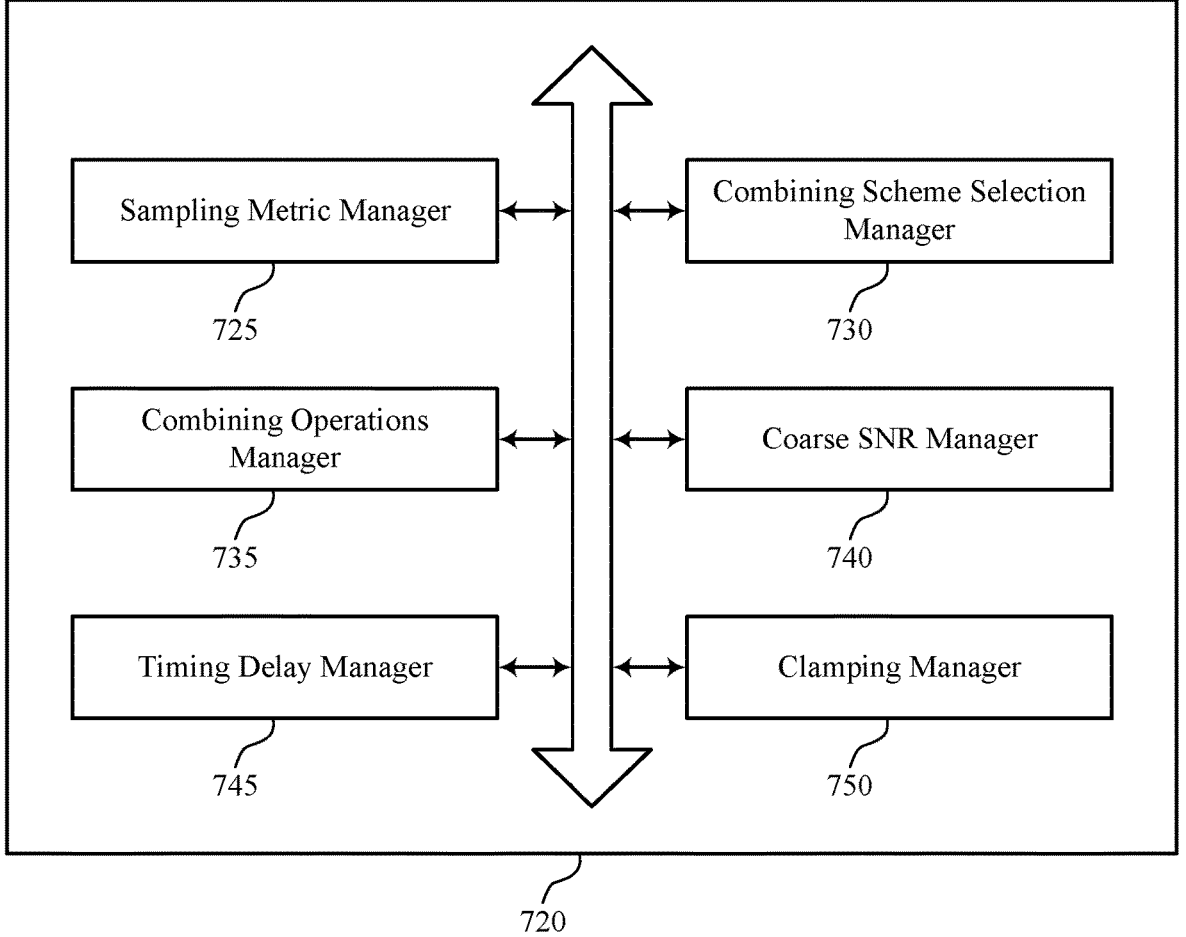
FIG. 7 shows a block diagram of a communications manager that supports combining schemes for shared open radio access networks in accordance with aspects of the present disclosure.

FIG. 7 shows a block diagram 700 of a communications manager 720 that supports combining schemes for shared open radio access networks in accordance with aspects of the present disclosure. The communications manager 720 may be an example of aspects of a communications manager 520, a communications manager 620, or both, as described herein. The communications manager 720, or various components thereof, may be an example of means for performing various aspects of combining schemes for shared open radio access networks as described herein. For example, the communications manager 720 may include a sampling metric manager 725, a combining scheme selection manager 730, a combining operations manager 735, a coarse SNR manager 740, a timing delay manager 745, a clamping manager 750, or any combination thereof. Each of these components may communicate, directly or indirectly, with one another (e.g., via one or more buses).

The communications manager 720 may support wireless communication at a DU associated with a base station in accordance with examples as disclosed herein. The sampling metric manager 725 may be configured as or otherwise support a means for determining, for one or more RUs associated with the DU, one or more sampling metrics associated with signal combining operations at the one or more RUs. The combining scheme selection manager 730 may be configured as or otherwise support a means for selecting, based on the one or more sampling metrics, a combining scheme to use for the signal combining operations. In some examples, the combining scheme selection manager 730 may be configured as or otherwise support a means for providing an indication of the combining scheme to at least one RU of the one or more RUs.

In some examples, the coarse SNR manager 740 may be configured as or otherwise support a means for identifying, for each RU of the one or more RUs, a coarse SNR for a channel associated with the signal combining operations of the RU, where the one or more sampling metrics include the coarse SNR for each RU. In some examples, the coarse SNR manager 740 may be configured as or otherwise support a means for selecting the combining scheme to use for the signal combining operations for each RU based on the coarse SNR of each RU, where the indication provided to each RU indicates the combining scheme selected for each RU.

In some examples, the coarse SNR manager 740 may be configured as or otherwise support a means for receiving information identifying the combining scheme from a fronthaul multiplexer associated with the DU.

In some examples, the coarse SNR manager 740 may be configured as or otherwise support a means for obtaining information identifying the coarse SNR for each RU of the one or more RUs, where identifying the coarse SNR is based on the information.

In some examples, the coarse SNR manager 740 may be configured as or otherwise support a means for measuring an average noise level on one or more subcarriers associated with the one or more RUs, where identifying the coarse SNR is based on the measuring.

In some examples, the timing delay manager 745 may be configured as or otherwise support a means for identifying, for each RU of the one or more RUs, a timing delay associated with the signal combining operations of the RU, where the one or more sampling metrics include the timing delay for each RU. In some examples, the timing delay manager 745 may be configured as or otherwise support a means for selecting the combining scheme to use for signal combining operations for each RU based on the timing delay of each RU, where the indication provided to each RU indicates the combining scheme selected for each RU.

In some examples, the timing delay includes a first timing delay of a first RU that is relative to a second timing delay of a second RU, and the combining scheme selected for each RU adjusts the first timing delay relative to the second timing delay, the second timing delay relative to the first timing delay, or both.

In some examples, the timing delay manager 745 may be configured as or otherwise support a means for obtaining information identifying the timing delay for each RU of the one or more RUs, where identifying the timing delay is based on the information.

In some examples, the timing delay manager 745 may be configured as or otherwise support a means for measuring the timing delay for the one or more RUs, where identifying the timing delay is based on the measuring.

In some examples, the clamping manager 750 may be configured as or otherwise support a means for identifying, for each RU of the one or more RUs, a clamp count limit associated with the signal combining operations of the RU, where the one or more sampling metrics include the clamp count limit for each RU. In some examples, the clamping manager 750 may be configured as or otherwise support a means for selecting the combining scheme for each RU to use for signal combining operations based on the clamp count limit of the RU, where the indication provided to each RU indicates the combining scheme selected for each RU.

In some examples, the combining scheme includes at least one of a simple combining scheme, an equal gain combining scheme, a maximal ratio combining scheme, a selection combining scheme, a tuning combining scheme where a first timing delay of a first RU is adjusted relative to a second timing delay of a second RU, or a combination thereof.

Additionally, or alternatively, the communications manager 720 may support wireless communication at a RU associated with a DU of a base station in accordance with examples as disclosed herein. In some examples, the combining scheme selection manager 730 may be configured as or otherwise support a means for obtaining an indication of a combining scheme selected for the RU to be used for signal combining operations at the RU, the combining scheme selected based on one or more sampling metrics associated with signal combining operations at the one or more RUs. The combining operations manager 735 may be configured as or otherwise support a means for performing, according to the combining scheme, the signal combining operations using signal samples obtained by the RU to obtain a combined signal. In some examples, the combining operations manager 735 may be configured as or otherwise support a means for providing the combined signal for output to the DU.

In some examples, the coarse SNR manager 740 may be configured as or otherwise support a means for providing information identifying a coarse SNR for the RU, where the one or more sampling metrics include the coarse SNR for the RU and the combining scheme is based on the coarse SNR of the RU.

In some examples, the coarse SNR manager 740 may be configured as or otherwise support a means for measuring an average noise level on one or more subcarriers associated with the RU. In some examples, the coarse SNR manager 740 may be configured as or otherwise support a means for identifying the coarse SNR for the RU based on the measuring, where the information is provided based on the identifying.

In some examples, the timing delay manager 745 may be configured as or otherwise support a means for providing information identifying a timing delay associated with the signal combining operations of the RU, where the one or more sampling metrics include the timing delay for the RU.

In some examples, the timing delay of the RU is relative to a second timing delay of a second RU and the combining scheme selected for the RU adjusts the timing delay relative to the second timing delay, the second timing delay relative to the timing delay, or both.

In some examples, the timing delay manager 745 may be configured as or otherwise support a means for measuring the timing delay for the RU, where the information is provided based on the measuring.

In some examples, the clamping manager 750 may be configured as or otherwise support a means for providing information identifying a clamp count limit associated with the signal combining operations of the RU, where the one or more sampling metrics include the clamp count limit for each RU.

In some examples, the combining scheme includes at least one of a simple combining scheme, an equal gain combining scheme, a maximal ratio combining scheme, a selection combining scheme, a tuning combining scheme where a timing delay of the RU is adjusted relative to a second timing delay of a second RU, or a combination thereof.

Figure 8:
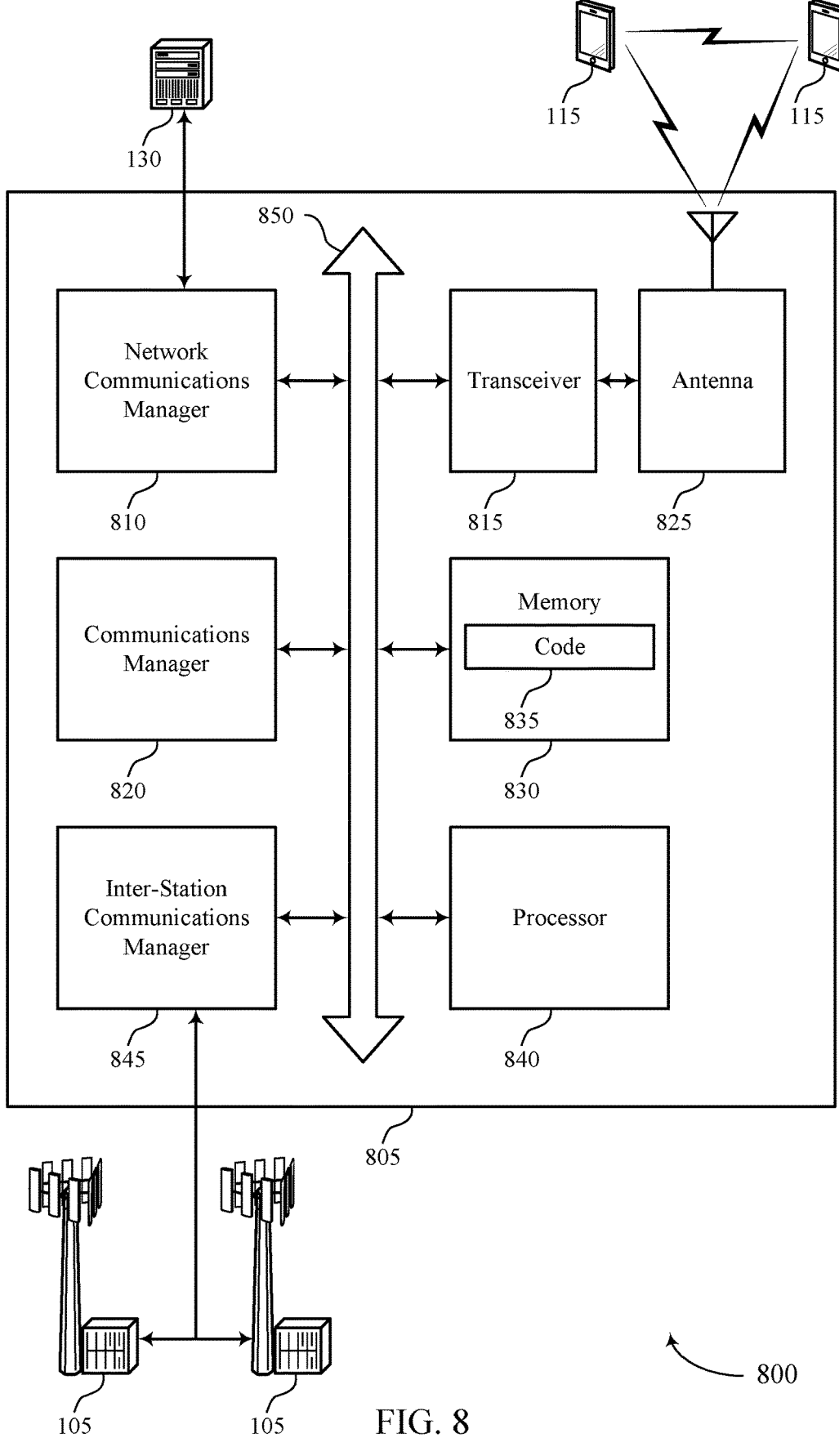
FIG. 8 shows a diagram of a system including a device that supports combining schemes for shared open radio access networks in accordance with aspects of the present disclosure.

FIG. 8 shows a diagram of a system 800 including a device 805 that supports combining schemes for shared open radio access networks in accordance with aspects of the present disclosure. The device 805 may be an example of or include the components of a device 505, a device 605, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include RAM and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting combining schemes for shared open radio access networks). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication at a DU associated with a base station in accordance with examples as disclosed herein. For example, the communications manager 820 may be configured as or otherwise support a means for determining, for one or more RUs associated with the DU, one or more sampling metrics associated with signal combining operations at the one or more RUs. The communications manager 820 may be configured as or otherwise support a means for selecting, based on the one or more sampling metrics, a combining scheme to use for the signal combining operations. The communications manager 820 may be configured as or otherwise support a means for providing an indication of the combining scheme to at least one RU of the one or more RUs.

Additionally, or alternatively, the communications manager 820 may support wireless communication at a RU associated with a DU of a base station in accordance with examples as disclosed herein. For example, the communications manager 820 may be configured as or otherwise support a means for obtaining an indication of a combining scheme selected for the RU to be used for signal combining operations at the RU, the combining scheme selected based on one or more sampling metrics associated with signal combining operations at the one or more RUs. The communications manager 820 may be configured as or otherwise support a means for performing, according to the combining scheme, the signal combining operations using signal samples obtained by the RU to obtain a combined signal. The communications manager 820 may be configured as or otherwise support a means for providing the combined signal for output to the DU.

By including or configuring the communications manager 820 in accordance with examples as described herein, the device 805 may support techniques for improving signal combining operations at a RU by selecting/updating the combining scheme for each RU based on the sampling metrics of that RU.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of combining schemes for shared open radio access networks as described herein, or the processor 840 and the memory 830 may be otherwise configured to perform or support such operations.

FIG. 9 shows a flowchart illustrating a method 900 that supports combining schemes for shared open radio access networks cells in accordance with aspects of the present disclosure. The operations of the method 900 may be implemented by a base station or its components as described herein. For example, the operations of the method 900 may be performed by a base station 105 as described with reference to FIGS. 1 through 8. In some examples, a base station may execute a set of instructions to control the functional elements of the base station to perform the described functions. Additionally, or alternatively, the base station may perform aspects of the described functions using special-purpose hardware.

At 905, the method may include determining, for one or more RUs associated with the DU, one or more sampling metrics associated with signal combining operations at the one or more RUs. The operations of 905 may be performed in accordance with examples as disclosed herein. In some examples, aspects of the operations of 905 may be performed by a sampling metric manager 725 as described with reference to FIG. 7.

At 910, the method may include selecting, based on the one or more sampling metrics, a combining scheme to use for the signal combining operations. The operations of 910 may be performed in accordance with examples as disclosed herein. In some examples, aspects of the operations of 910 may be performed by a combining scheme selection manager 730 as described with reference to FIG. 7.

At 915, the method may include providing an indication of the combining scheme to at least one RU of the one or more RUs. The operations of 915 may be performed in accordance with examples as disclosed herein. In some examples, aspects of the operations of 915 may be performed by a combining scheme selection manager 730 as described with reference to FIG. 7.

FIG. 10 shows a flowchart illustrating a method 1000 that supports combining schemes for shared open radio access networks in accordance with aspects of the present disclosure. The operations of the method 1000 may be implemented by a base station or its components as described herein. For example, the operations of the method 1000 may be performed by a base station 105 as described with reference to FIGS. 1 through 8. In some examples, a base station may execute a set of instructions to control the functional elements of the base station to perform the described functions. Additionally, or alternatively, the base station may perform aspects of the described functions using special-purpose hardware.

At 1005, the method may include determining, for one or more RUs associated with the DU, one or more sampling metrics associated with signal combining operations at the one or more RUs. The operations of 1005 may be performed in accordance with examples as disclosed herein. In some examples, aspects of the operations of 1005 may be performed by a sampling metric manager 725 as described with reference to FIG. 7.

At 1010, the method may include identifying, for each RU of the one or more RUs, a coarse SNR for a channel associated with the signal combining operations of the RU, where the one or more sampling metrics include the coarse SNR for each RU. The operations of 1010 may be performed in accordance with examples as disclosed herein. In some examples, aspects of the operations of 1010 may be performed by a coarse SNR manager 740 as described with reference to FIG. 7.

At 1015, the method may include selecting, based on the one or more sampling metrics, a combining scheme to use for the signal combining operations. The operations of 1015 may be performed in accordance with examples as disclosed herein. In some examples, aspects of the operations of 1015 may be performed by a combining scheme selection manager 730 as described with reference to FIG. 7.

At 1020, the method may include selecting the combining scheme to use for the signal combining operations for each RU based on the coarse SNR of each RU, where the indication provided to each RU indicates the combining scheme selected for each RU. The operations of 1020 may be performed in accordance with examples as disclosed herein. In some examples, aspects of the operations of 1020 may be performed by a coarse SNR manager 740 as described with reference to FIG. 7.

At 1025, the method may include providing an indication of the combining scheme to at least one RU of the one or more RUs. The operations of 1025 may be performed in accordance with examples as disclosed herein. In some examples, aspects of the operations of 1025 may be performed by a combining scheme selection manager 730 as described with reference to FIG. 7.

FIG. 11 shows a flowchart illustrating a method 1100 that supports combining schemes for shared open radio access networks in accordance with aspects of the present disclosure. The operations of the method 1100 may be implemented by a base station or its components as described herein. For example, the operations of the method 1100 may be performed by a base station 105 as described with reference to FIGS. 1 through 8. In some examples, a base station may execute a set of instructions to control the functional elements of the base station to perform the described functions. Additionally, or alternatively, the base station may perform aspects of the described functions using special-purpose hardware.

At 1105, the method may include determining, for one or more RUs associated with the DU, one or more sampling metrics associated with signal combining operations at the one or more RUs. The operations of 1105 may be performed in accordance with examples as disclosed herein. In some examples, aspects of the operations of 1105 may be performed by a sampling metric manager 725 as described with reference to FIG. 7.

At 1110, the method may include identifying, for each RU of the one or more RUs, a timing delay associated with the signal combining operations of the RU, where the one or more sampling metrics include the timing delay for each RU. The operations of 1110 may be performed in accordance with examples as disclosed herein. In some examples, aspects of the operations of 1110 may be performed by a timing delay manager 745 as described with reference to FIG. 7.

At 1115, the method may include selecting, based on the one or more sampling metrics, a combining scheme to use for the signal combining operations. The operations of 1115 may be performed in accordance with examples as disclosed herein. In some examples, aspects of the operations of 1115 may be performed by a combining scheme selection manager 730 as described with reference to FIG. 7.

At 1120, the method may include selecting the combining scheme to use for signal combining operations for each RU based on the timing delay of each RU, where the indication provided to each RU indicates the combining scheme selected for each RU. The operations of 1120 may be performed in accordance with examples as disclosed herein. In some examples, aspects of the operations of 1120 may be performed by a timing delay manager 745 as described with reference to FIG. 7.

At 1125, the method may include providing an indication of the combining scheme to at least one RU of the one or more RUs. The operations of 1125 may be performed in accordance with examples as disclosed herein. In some examples, aspects of the operations of 1125 may be performed by a combining scheme selection manager 730 as described with reference to FIG. 7.

FIG. 12 shows a flowchart illustrating a method 1200 that supports combining schemes for shared open radio access networks in accordance with aspects of the present disclosure. The operations of the method 1200 may be implemented by a base station or its components as described herein. For example, the operations of the method 1200 may be performed by a base station 105 as described with reference to FIGS. 1 through 8. In some examples, a base station may execute a set of instructions to control the functional elements of the base station to perform the described functions. Additionally, or alternatively, the base station may perform aspects of the described functions using special-purpose hardware.

At 1205, the method may include obtaining an indication of a combining scheme selected for the RU to be used for signal combining operations at the RU, the combining scheme selected based on one or more sampling metrics associated with signal combining operations at the one or more RUs. The operations of 1205 may be performed in accordance with examples as disclosed herein. In some examples, aspects of the operations of 1205 may be performed by a combining scheme selection manager 730 as described with reference to FIG. 7.

At 1210, the method may include performing, according to the combining scheme, the signal combining operations using signal samples obtained by the RU to obtain a combined signal. The operations of 1210 may be performed in accordance with examples as disclosed herein. In some examples, aspects of the operations of 1210 may be performed by a combining operations manager 735 as described with reference to FIG. 7.

At 1215, the method may include providing the combined signal for output to the DU. The operations of 1215 may be performed in accordance with examples as disclosed herein. In some examples, aspects of the operations of 1215 may be performed by a combining operations manager 735 as described with reference to FIG. 7.

FIG. 13 shows a flowchart illustrating a method 1300 that supports combining schemes for shared open radio access networks in accordance with aspects of the present disclosure. The operations of the method 1300 may be implemented by a base station or its components as described herein. For example, the operations of the method 1300 may be performed by a base station 105 as described with reference to FIGS. 1 through 8. In some examples, a base station may execute a set of instructions to control the functional elements of the base station to perform the described functions. Additionally, or alternatively, the base station may perform aspects of the described functions using special-purpose hardware.

At 1305, the method may include obtaining an indication of a combining scheme selected for the RU to be used for signal combining operations at the RU, the combining scheme selected based on one or more sampling metrics associated with signal combining operations at the one or more RUs. The operations of 1305 may be performed in accordance with examples as disclosed herein. In some examples, aspects of the operations of 1305 may be performed by a combining scheme selection manager 730 as described with reference to FIG. 7.

At 1310, the method may include providing information identifying a clamp count limit associated with the signal combining operations of the RU, where the one or more sampling metrics include the clamp count limit for each RU. The operations of 1310 may be performed in accordance with examples as disclosed herein. In some examples, aspects of the operations of 1310 may be performed by a clamping manager 750 as described with reference to FIG. 7.

At 1315, the method may include performing, according to the combining scheme, the signal combining operations using signal samples obtained by the RU to obtain a combined signal. The operations of 1315 may be performed in accordance with examples as disclosed herein. In some examples, aspects of the operations of 1315 may be performed by a combining operations manager 735 as described with reference to FIG. 7.

At 1320, the method may include providing the combined signal for output to the DU. The operations of 1320 may be performed in accordance with examples as disclosed herein.

In some examples, aspects of the operations of 1320 may be performed by a combining operations manager 735 as described with reference to FIG. 7.

The following provides an overview of aspects of the present disclosure:

Aspect 1: A method for wireless communication at a DU associated with a base station, comprising: determining, for one or more RUs associated with the DU, one or more sampling metrics associated with signal combining operations at the one or more RUs; selecting, based at least in part on the one or more sampling metrics, a combining scheme to use for the signal combining operations; and providing an indication of the combining scheme to at least one RU of the one or more RUs.

Aspect 2: The method of aspect 1, further comprising: identifying, for each RU of the one or more RUs, a coarse SNR for a channel associated with the signal combining operations of the RU, wherein the one or more sampling metrics comprise the coarse SNR for each RU; and selecting the combining scheme to use for the signal combining operations for each RU based at least in part on the coarse SNR of each RU, wherein the indication provided to each RU indicates the combining scheme selected for each RU.

Aspect 3: The method of aspect 2, further comprising: receiving information identifying the combining scheme from a FHM associated with the DU.

Aspect 4: The method of any of aspects 2 through 3, further comprising: obtaining information identifying the coarse SNR for each RU of the one or more RUs, wherein identifying the coarse SNR is based at least in part on the information.

Aspect 5: The method of any of aspects 2 through 4, further comprising: measuring an average noise level on one or more subcarriers associated with the one or more RUs, wherein identifying the coarse SNR is based at least in part on the measuring.

Aspect 6: The method of any of aspects 1 through 5, further comprising: identifying, for each RU of the one or more RUs, a timing delay associated with the signal combining operations of the RU, wherein the one or more sampling metrics comprise the timing delay for each RU; and selecting the combining scheme to use for signal combining operations for each RU based at least in part on the timing delay of each RU, wherein the indication provided to each RU indicates the combining scheme selected for each RU.

Aspect 7: The method of aspect 6, wherein the timing delay comprises a first timing delay of a first RU that is relative to a second timing delay of a second RU, and the combining scheme selected for each RU adjusts the first timing delay relative to the second timing delay, the second timing delay relative to the first timing delay, or both.

Aspect 8: The method of any of aspects 6 through 7, further comprising: obtaining information identifying the timing delay for each RU of the one or more RUs, wherein identifying the timing delay is based at least in part on the information.

Aspect 9: The method of any of aspects 6 through 8, further comprising: measuring the timing delay for the one or more RUs, wherein identifying the timing delay is based at least in part on the measuring.

Aspect 10: The method of any of aspects 1 through 9, further comprising: identifying, for each RU of the one or more RUs, a clamp count limit associated with the signal combining operations of the RU, wherein the one or more sampling metrics comprise the clamp count limit for each RU; and selecting the combining scheme for each RU to use for signal combining operations based at least in part on the clamp count limit of the RU, wherein the indication provided to each RU indicates the combining scheme selected for each RU.

Aspect 11: The method of any of aspects 1 through 10, wherein the combining scheme comprises at least one of a simple combining scheme, an equal gain combining scheme, a maximal ratio combining scheme, a selection combining scheme, a tuning combining scheme where a first timing delay of a first RU is adjusted relative to a second timing delay of a second RU, or a combination thereof.

Aspect 12: A method for wireless communication at a RU associated with a DU of a base station, comprising: obtaining an indication of a combining scheme selected for the RU to be used for signal combining operations at the RU, the combining scheme selected based at least in part on one or more sampling metrics associated with signal combining operations at the one or more RUs; performing, according to the combining scheme, the signal combining operations using signal samples obtained by the RU to obtain a combined signal; and providing the combined signal for output to the DU.

Aspect 13: The method of aspect 12, further comprising: providing information identifying a coarse SNR for the RU, wherein the one or more sampling metrics comprise the coarse SNR for the RU and the combining scheme is based at least in part on the coarse SNR of the RU.

Aspect 14: The method of aspect 13, further comprising: measuring an average noise level on one or more subcarriers associated with the RU; and identifying the coarse SNR for the RU based at least in part on the measuring, wherein the information is provided based at least in part on the identifying.

Aspect 15: The method of any of aspects 12 through 14, further comprising: providing information identifying a timing delay associated with the signal combining operations of the RU, wherein the one or more sampling metrics comprise the timing delay for the RU.

Aspect 16: The method of aspect 15, wherein the timing delay of the RU is relative to a second timing delay of a second RU and the combining scheme selected for the RU adjusts the timing delay relative to the second timing delay, the second timing delay relative to the timing delay, or both.

Aspect 17: The method of any of aspects 15 through 16, further comprising: measuring the timing delay for the RU, wherein the information is provided based at least in part on the measuring.

Aspect 18: The method of any of aspects 12 through 17, further comprising: providing information identifying a clamp count limit associated with the signal combining operations of the RU, wherein the one or more sampling metrics comprise the clamp count limit for each RU.

Aspect 19: The method of any of aspects 12 through 18, wherein the combining scheme comprises at least one of a simple combining scheme, an equal gain combining scheme, a maximal ratio combining scheme, a selection combining scheme, a tuning combining scheme where a timing delay of the RU is adjusted relative to a second timing delay of a second RU, or a combination thereof.

Aspect 20: An apparatus for wireless communication at a DU associated with a base station, comprising a processor; memory coupled with the processor; and instructions stored in the memory and executable by the processor to cause the apparatus to perform a method of any of aspects 1 through 11.

Aspect 21: An apparatus for wireless communication at a DU associated with a base station, comprising at least one means for performing a method of any of aspects 1 through 11.

Aspect 22: A non-transitory computer-readable medium storing code for wireless communication at a DU associated with a base station, the code comprising instructions executable by a processor to perform a method of any of aspects 1 through 11.

Aspect 23: An apparatus for wireless communication at a RU associated with a DU of a base station, comprising a processor; memory coupled with the processor; and instructions stored in the memory and executable by the processor to cause the apparatus to perform a method of any of aspects 12 through 19.

Aspect 24: An apparatus for wireless communication at a RU associated with a DU of a base station, comprising at least one means for performing a method of any of aspects 12 through 19.

Aspect 25: A non-transitory computer-readable medium storing code for wireless communication at a RU associated with a DU of a base station, the code comprising instructions executable by a processor to perform a method of any of aspects 12 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a distributed unit associated with a network entity, comprising:

determining, for one or more radio units associated with the distributed unit, one or more sampling metrics associated with signal combining operations at the one or more radio units, wherein the one or more sampling metrics comprise, for each radio unit, a coarse signal-to-noise ratio identified for a channel associated with the signal combining operations of the radio unit;

selecting a combining scheme to use for the signal combining operations for each radio unit based at least in part on the one or more sampling metrics; and providing an indication of the combining scheme selected for each radio unit to the one or more radio units.

2. The method of claim 1, further comprising:

receiving information identifying the combining scheme from a fronthaul multiplexer associated with the distributed unit.

3. The method of claim 1, further comprising:

obtaining information identifying the coarse signal-to-noise ratio for each radio unit of the one or more radio units, wherein identifying the coarse signal-to-noise ratio is based at least in part on the information.

4. The method of claim 1, further comprising:

measuring an average noise level on one or more subcarriers associated with the one or more radio units, wherein identifying the coarse signal-to-noise ratio is based at least in part on the measuring.

5. The method of claim 1, further comprising:

identifying, for each radio unit of the one or more radio units, a timing delay associated with the signal combining operations of the radio unit, wherein the one or more sampling metrics comprise the timing delay for each radio unit; and selecting the combining scheme to use for signal combining operations for each radio unit based at least in part on the timing delay of each radio unit, wherein the indication provided to each radio unit indicates the combining scheme selected for each radio unit.

6. The method of claim 5, wherein the timing delay comprises a first timing delay of a first radio unit that is relative to a second timing delay of a second radio unit, and the combining scheme selected for each radio unit adjusts the first timing delay relative to the second timing delay, the second timing delay relative to the first timing delay, or both.

7. The method of claim 5, further comprising:

obtaining information identifying the timing delay for each radio unit of the one or more radio units, wherein identifying the timing delay is based at least in part on the information.

8. The method of claim 5, further comprising:

measuring the timing delay for the one or more radio units, wherein identifying the timing delay is based at least in part on the measuring.

9. The method of claim 1, further comprising:

identifying, for each radio unit of the one or more radio units, a clamp count limit associated with the signal combining operations of the radio unit, wherein the one or more sampling metrics comprise the clamp count limit for each radio unit; and selecting the combining scheme for each radio unit to use for signal combining operations based at least in part on the clamp count limit of the radio unit, wherein the indication provided to each radio unit indicates the combining scheme selected for each radio unit.

10. The method of claim 1, wherein the combining scheme comprises at least one of a simple combining scheme, an equal gain combining scheme, a maximal ratio combining scheme, a selection combining scheme, a tuning combining scheme where a first timing delay of a first radio unit is adjusted relative to a second timing delay of a second radio unit, or a combination thereof.

11. A method for wireless communication at a radio unit associated with a distributed unit of a network entity, comprising:

providing information identifying a coarse signal-to-noise ratio for the radio unit, the coarse signal-to-noise ratio identified for a channel associated with signal combining operations at the radio unit;

obtaining an indication of a combining scheme selected for the radio unit to be used for signal combining operations at the radio unit, the combining scheme selected based at least in part on one or more sampling metrics associated with signal combining operations at the radio unit, wherein the one or more sampling metrics comprise the coarse signal-to-noise ratio;

performing, according to the combining scheme, the signal combining operations using signal samples obtained by the radio unit to obtain a combined signal; and providing the combined signal for output to the distributed unit.

12. The method of claim 11, further comprising:

measuring an average noise level on one or more subcarriers associated with the radio unit; and identifying the coarse signal-to-noise ratio for the radio unit based at least in part on the measuring, wherein the information is provided based at least in part on the identifying.

13. The method of claim 11, further comprising:

providing information identifying a timing delay associated with the signal combining operations of the radio unit, wherein the one or more sampling metrics comprise the timing delay for the radio unit.

14. The method of claim 13, wherein the timing delay of the radio unit is relative to a second timing delay of a second radio unit and the combining scheme selected for the radio unit adjusts the timing delay relative to the second timing delay, the second timing delay relative to the timing delay, or both.

15. The method of claim 13, further comprising:
measuring the timing delay for the radio unit, wherein the information is provided based at least in part on the measuring.

16. The method of claim 11, further comprising:
providing information identifying a clamp count limit associated with the signal combining operations of the radio unit, wherein the one or more sampling metrics comprise the clamp count limit for each radio unit.

17. The method of claim 11, wherein the combining scheme comprises at least one of a simple combining scheme, an equal gain combining scheme, a maximal ratio combining scheme, a selection combining scheme, a tuning combining scheme where a timing delay of the radio unit is adjusted relative to a second timing delay of a second radio unit, or a combination thereof.

18. An apparatus for wireless communication at a distributed unit associated with a network entity, comprising:
a processor;
memory coupled with the processor; and
instructions stored in the memory and executable by the processor to cause the apparatus to:
    determine, for one or more radio units associated with the distributed unit, one or more sampling metrics associated with signal combining operations at the one or more radio units, wherein the one or more sampling metrics comprise, for each radio unit, a coarse signal-to-noise ratio identified for a channel associated with the signal combining operations of the radio unit;
    select a combining scheme to use for the signal combining operations for each radio unit based at least in part on the one or more sampling metrics; and
    provide an indication of the combining scheme selected for each radio unit to the one or more radio units.

19. The apparatus of claim 18, wherein the instructions are further executable by the processor to cause the apparatus to:
    receive information identifying the combining scheme from a fronthaul multiplexer associated with the distributed unit.

20. The apparatus of claim 18, wherein the instructions are further executable by the processor to cause the apparatus to:
    obtain information identifying the coarse signal-to-noise ratio for each radio unit of the one or more radio units, wherein identifying the coarse signal-to-noise ratio is based at least in part on the information.

21. The apparatus of claim 18, wherein the instructions are further executable by the processor to cause the apparatus to:
    measure an average noise level on one or more subcarriers associated with the one or more radio units, wherein identifying the coarse signal-to-noise ratio is based at least in part on the measuring.

22. The apparatus of claim 18, wherein the instructions are further executable by the processor to cause the apparatus to:
    identify, for each radio unit of the one or more radio units, a timing delay associated with the signal combining operations of the radio unit, wherein the one or more sampling metrics comprise the timing delay for each radio unit; and
select the combining scheme to use for signal combining operations for each radio unit based at least in part on the timing delay of each radio unit, wherein the indication provided to each radio unit indicates the combining scheme selected for each radio unit.

23. The apparatus of claim 22, wherein the timing delay comprises a first timing delay of a first radio unit that is relative to a second timing delay of a second radio unit, and the combining scheme selected for each radio unit adjusts the first timing delay relative to the second timing delay, the second timing delay relative to the first timing delay, or both.

24. The apparatus of claim 22, wherein the instructions are further executable by the processor to cause the apparatus to:
    obtain information identifying the timing delay for each radio unit of the one or more radio units, wherein identifying the timing delay is based at least in part on the information.

25. The apparatus of claim 22, wherein the instructions are further executable by the processor to cause the apparatus to:
    measure the timing delay for the one or more radio units, wherein identifying the timing delay is based at least in part on the measuring.

26. The apparatus of claim 18, wherein the instructions are further executable by the processor to cause the apparatus to:
    identify, for each radio unit of the one or more radio units, a clamp count limit associated with the signal combining operations of the radio unit, wherein the one or more sampling metrics comprise the clamp count limit for each radio unit; and
    select the combining scheme for each radio unit to use for signal combining operations based at least in part on the clamp count limit of the radio unit, wherein the indication provided to each radio unit indicates the combining scheme selected for each radio unit.

27. An apparatus for wireless communication at a radio unit associated with a distributed unit of a network entity, comprising:
a processor;
memory coupled with the processor; and
instructions stored in the memory and executable by the processor to cause the apparatus to:
provide information identifying a coarse signal-to-noise ratio for the radio unit, the coarse signal-to-noise ratio identified for a channel associated with signal combining operations at the radio unit;
obtain an indication of a combining scheme selected for the radio unit to be used for signal combining operations at the radio unit, the combining scheme selected based at least in part on one or more sampling metrics associated with signal combining operations at the radio unit, wherein the one or more sampling metrics comprise the coarse signal-to-noise ratio;
perform, according to the combining scheme, the signal combining operations using signal samples obtained by the radio unit to obtain a combined signal; and
provide the combined signal for output to the distributed unit.

* * * * *